(12) United States Patent
Dvir et al.

(10) Patent No.: US 11,546,397 B2
(45) Date of Patent: Jan. 3, 2023

(54) VR 360 VIDEO FOR REMOTE END USERS

(71) Applicant: HUAWEI TECHNOLOGIES CO., LTD., Shenzhen (CN)

(72) Inventors: Itsik Dvir, Hod Hasharon (IL); Amiram Allouche, Hod Hasharon (IL); Feng Li, Nanjing (CN); Yue Yin, Nanjing (CN); Guy Almog, Munich (DE); Guanhua Zhuang, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/905,840

(22) Filed: Jun. 18, 2020

(65) Prior Publication Data
US 2020/0322696 A1 Oct. 8, 2020

Related U.S. Application Data

(63) Continuation of application No. PCT/EP2017/084477, filed on Dec. 22, 2017.

(51) Int. Cl.
*H04N 13/279* (2018.01)
*H04L 65/611* (2022.01)
(Continued)

(52) U.S. Cl.
CPC ........ *H04L 65/611* (2022.05); *G06F 3/04815* (2013.01); *G06T 15/205* (2013.01);
(Continued)

(58) Field of Classification Search
CPC . G06F 3/04815; G06T 15/205; G06T 19/006; G06T 2210/08; G06T 2210/12;
(Continued)

(56) References Cited

U.S. PATENT DOCUMENTS

2002/0021353 A1 2/2002 Denies
2013/0326551 A1* 12/2013 Chatterjee ............. H04W 36/22
725/9
(Continued)

FOREIGN PATENT DOCUMENTS

EP 3065406 A1 9/2016
WO 2017127816 A1 7/2017

OTHER PUBLICATIONS

Boyce J et al, "Spherical viewport SEI for HEVC and AVC 360 video", Joint Collaborative Team on Video Coding (JCT-VC) of ITU-T SG 16 WP 3 and ISO/IEC JTC 1/SC 29/WG 11. JCTVC-Z0034, 26th Meeting: Geneva, CH, Jan. 12-20, 2017, total 6 pages. XP030118141.

(Continued)

*Primary Examiner* — James T Boylan
(74) *Attorney, Agent, or Firm* — Stein IP, LLC

(57) ABSTRACT

An apparatus for delivering virtual reality data portions to a client device, including a processing unit configured to perform the following in each one of a plurality of iterations: (1) receive from a network a current orientation data indicating a current orientation of a client device, (2) apply a rotation to a segment of a sphere defined in a virtual reality (VR) video file according to the current orientation, (3) crop from the rotated segment of the sphere in an equirectangular projection format an extended field of view (EFOV) frame in the equirectangular projection format according to the current orientation, and (4) instruct the network to transmit the EFOV frame to the client device.

24 Claims, 7 Drawing Sheets

(51) Int. Cl.
*G06T 15/20* (2011.01)
*G06T 19/00* (2011.01)
*H04L 65/80* (2022.01)
*H04N 13/117* (2018.01)
*G06F 3/04815* (2022.01)
*H04N 5/232* (2006.01)
*H04N 5/262* (2006.01)
*H04N 21/426* (2011.01)
*H04N 21/81* (2011.01)

(52) U.S. Cl.
CPC ............ *G06T 19/006* (2013.01); *H04L 65/80* (2013.01); *H04N 5/23238* (2013.01); *H04N 5/2628* (2013.01); *H04N 13/117* (2018.05); *H04N 13/279* (2018.05); *H04N 21/42653* (2013.01); *H04N 21/816* (2013.01)

(58) Field of Classification Search
CPC . G06T 2210/22; H04L 65/4076; H04L 65/80; H04N 13/117; H04N 13/279; H04N 21/23439; H04N 21/2402; H04N 21/42653; H04N 21/6587; H04N 21/816; H04N 5/23238; H04N 5/2628
See application file for complete search history.

(56) References Cited

U.S. PATENT DOCUMENTS

| | | | |
|---|---|---|---|
| 2014/0087877 A1* | 3/2014 | Krishnan | G06T 11/00 463/33 |
| 2016/0012855 A1* | 1/2016 | Krishnan | G11B 27/105 386/241 |
| 2016/0045826 A1* | 2/2016 | Speck | A63F 13/335 463/31 |
| 2017/0053325 A1* | 2/2017 | VanDuyn | G06F 3/0485 |
| 2017/0094301 A1* | 3/2017 | Gu | H04N 21/2402 |
| 2017/0302972 A1* | 10/2017 | Zhang | H04L 67/38 |
| 2018/0077209 A1* | 3/2018 | So | G06Q 30/02 |
| 2018/0084257 A1* | 3/2018 | Abbas | H04N 19/147 |
| 2018/0098131 A1 | 4/2018 | Zhou | |
| 2018/0114342 A1* | 4/2018 | Lee | G06T 7/215 |
| 2018/0164593 A1 | 6/2018 | Van Der Auwera et al. | |
| 2018/0189958 A1* | 7/2018 | Budagavi | G06T 7/20 |
| 2018/0192001 A1* | 7/2018 | Boyce | H04N 19/46 |
| 2019/0174125 A1* | 6/2019 | Ninan | G01S 3/00 |
| 2019/0310472 A1* | 10/2019 | Schilt | H04N 21/2662 |

OTHER PUBLICATIONS

Yan Ye, "Algorithm descriptions of projection format conversion and video quality metrics in 360Lib (Version 5)", Joint Video Exploration Team (JVET) of ITU-T SG 16 WP 3 and ISO/IEC JTC 1/SC 29/WG 11. JVET-H1004, 8th Meeting: Macao, CN, Oct. 18-24, 2017, total 46 pages. XP030151112.

Lan Xie et al, "360ProbDASH : Improving QoE of 360 Video Streaming Using Tile-based HTTP Adaptive Streaming", Proceedings of the 2017 ACM on Multimedia Conference , MM "17, Oct. 2017, p. 315-323, XP055505663.

ISO/JEC FDIS 23090-2:201x (E), ISO/IEC JTC 1/SC 29/WG 11, Infonnation technology-Coded representation of immersive media (MPEG-I)—Part 2: Omnidirectional media format, Apr. 2018. total 182 pages. XP030024190.

Van Der Auwera G et al, "AHG8: Truncated Square Pyramid Projection (TSP) For 360 Video", Joint Video Exploration Team (JVET) of ITU-T SG 16 WP 3 and ISO/IEC JTC 1/SC 29/WG 11, No. JVET-D0071, 4th Meeting: Chengdu, CN, Oct. 15-21, 2016, total 11 pages. XP030150304.

Huawei: Whitepaper on the VR-Oriented Bearer Network Requirement(2016), Sep. 2016. Retrieved from the internet:https://www-file.huawei.com/~/media/CORPORATE/PDF/white%20paper/whitepaper-on-the-vr-oriented-bearer-network-requirement-en.pdf, total 54 pages.

Robert Skupin et al. Tile Based HEVC Video for Head Mounted Displays, 2016 IEEE International Symposium on Multimedia, pp. 399-400.

Evgeny Kuzyakov et al. Next-generation video encoding techniques for 360 video and VR, Jan. 21, 2016, total 7 pages.

Yan Ye et al., Algorithm descriptions of projection format conversion and video quality metrics in 360Lib, JVET-F1003-v1, 6th Meeting: Hobart, AU, Mar. 31-Apr. 7, 2017, Joint Video Exploration Team (JVET) of ITU-T SG 16 WP 3 and ISO/IEC JTC 1/SC 29/WG 11, 6th Meeting: Hobart, AU, Mar. 31-Apr. 7, 2017, total 32 pages.

* cited by examiner

VR 360 VIDEO FOR REMOTE END USERS

CROSS-REFERENCE TO RELATED APPLICATIONS

This application is a continuation of International Application No. PCT/EP2017/084477, filed on Dec. 22, 2017, the disclosure of which is hereby incorporated by reference in its entirety.

FIELD AND BACKGROUND OF THE INVENTION

Some embodiments of the present invention relate to streaming virtual reality (VR) 360 video content to client devices and, more particularly, but not exclusively, to low latency, high resolution and high throughput VR 360 video content streaming to client devices.

Consumption of VR 360 video content, i.e., 360-degree videos, immersive videos or spherical videos is constantly increasing. This may result from rapid advances in the capabilities of traditional devices, for example, desktop computers, laptop computers, Smartphones, tablets and/or the like having displays (screens) supporting 2 Dimensions (2D) presentation, i.e., a monoscopic presentation in which one image is directed to both eyes. However, the major driving force for the increase in VR 360 video content consumption may be the increased availability and reduced costs of VR 360 client devices, for example, head mounted displays (HMDs), stereoscopic goggles and/or the like supporting 3 Dimensions (3D) presentation, i.e., a stereoscopic presentation in which two distinct images are directed individually to each eye for a 3D effect. Moreover, there is a continuous demand for better user experience, requiring high resolution image size (e.g., 8K, 16K), high frame rate (e.g., 60, 90 fps) and low motion to photon (MTP) latency (e.g., below 20 milliseconds).

On-line streaming of such VR 360 video content is therefore highly desired as the market potential for such streaming is practically endless for a plurality of applications, ranging from gaming applications, through training and simulation applications to life saving medical applications and/or defense applications.

SUMMARY OF THE INVENTION

According to a first aspect of the present invention there is provided an apparatus for delivering virtual reality data portions to a client device, comprising a processing unit configured to perform the following in each one of a plurality of iterations:
receive from a network a current orientation data indicating a current orientation of a client device;
apply a rotation to a segment of a sphere defined in a VR video file according to the current orientation;
crop from the rotated segment of the sphere in an equirectangular projection format an extended field of view (EFOV) frame in the equirectangular projection format according to the current orientation; and
instruct the network to transmit the EFOV frame to the client device.

According to a second aspect of the present invention there is provided a method for sequentially delivering virtual reality data portions to a client device, comprising, in each of a plurality of iterations, performing the following:
receiving via a network a current orientation data of a client device;
applying a rotation to a segment of a sphere defined in VR video file in an equirectangular projection format according to the current orientation;
cropping from the rotated segment of the sphere an EFOV frame in the equirectangular projection format according to the current orientation data; and
instructing the network to transmit the EFOV frame to the client device.

By delivering the EFOV frames which constitute only a significantly small portion of the VR 360 video content, the required network bandwidth may be significantly reduced thus achieving high throughput while maintain high quality and/or high resolution VR 360 video streaming.

According to a third aspect of the present invention there is provided a client device for sequentially presenting virtual reality data portions, comprising:
a display;
a network interface configured to send via a network orientation data of the client device, measured in each of a plurality of iterations and receive an EFOV frame in an equirectangular projection format in response to sending the orientation data; and
a processing unit configured to perform the following in response to receiving the EFOV frame:
rotate the EFOV frame according to an updated current orientation data measured for the client device;
crop an actual field of view frame from the rotated EFOV frame according to the updated current orientation data;
convert the actual field of view frame to a projection format defined by properties of the display; and
instruct a presentation of the actual field of view frame in the projection format on the display.

According to a fourth aspect of the present invention there is provided a method for sequentially presenting virtual reality data portions, comprising, in each of a plurality of iterations, performing the following:
sending from a client device, via a network, a current orientation data measured for the client device;
receiving via the network an EFOV frame in an equirectangular projection format in response to sending of the current orientation value;
in response to receiving the EFOV frame:
acquiring an updated current orientation value measured for the client device after the current orientation data is measured,
rotating the EFOV frame according to the updated current orientation value,
cropping an actual field of view frame from the rotated EFOV frame according to the updated current orientation value, and
presenting the actual field of view frame on a display of the client device;
wherein the actual field of view frame is converted to a rectilinear format before the presentation of the actual field of view frame.

By delivering the EFOV frames which constitute only a significantly small portion of the VR 360 video content, the required network bandwidth may be significantly reduced. As the client device processes only the significantly small EFOV frames (compared to the overall VR 360 video file), the computing resources required at the client device may be significantly reduced thus significantly reducing complexity, cost and/or the like of the client device.

In an optional implementation form of the first and/or second aspects, the EFOV frame is encoded using a low-latency encoder before the transmission of the EFOV frame.

Applying the low latency encoder for encoding the EFOV frames transmitted to the client device may significantly reduce the latency for the VR 360 video content delivery.

In a further implementation form of the first and/or second aspects, the processing unit is configured to instruct the network to transmit the EFOV frame in a real-time media transfer protocol in an ultra-low-latency video encoder-decoder channel having a delay of less than 10 milliseconds. Using real time media transfer protocol(s) over ultra-low latency encoder-decoder channels may further reduce the latency for the VR 360 video content delivery.

In a further implementation form of the first and/or second aspects, the processing unit converts the EFOV frame from the equirectangular projection format to a rectilinear format before the transmission of the EFOV frame to the client device via the network. Converting the EFOV frames to a standard projection format, for example, the equirectangular projection may facilitate the use of standard equipment, for example, encoders, decoders, display adapters and/or the like as well as standard image and/or video processing tools, applications and/or services to process the EFOV frames.

In a further implementation form of the first and/or second aspects, the processing unit is configured to receive round trip delay time (RTT) data originated from the client device, the RTT data is received in a quality of experience (QoE) message comprising a time stamp. Wherein the processing unit calculates an estimated latency value for a communication between the apparatus and the client device over the network according to the time stamp; wherein an area of the EFOV frame is calculated according to the estimated latency value. By adjusting the area (size) of the EFOV frames according to the RTT, the amount of extra presentation data included in the EFOV frames is adjusted to compensate for the measured RTT. This means that the higher the RTT, the area of the EFOV frames may be increased to include extra presentation data that may be used at the client device to compensate for the RTT.

In an optional implementation form of the first and/or second aspects, the area of the EFOV frame is a function of field of an equirectangular projection format height and width values of the VR video file and a field of view (FOV), height and width values determined according to the current orientation data. While the EFOV frames are naturally constructed according to the size of the VR 360 video file, the size of the EFOV frames may be further set according to the projection attributes at the client device with respect to the FOV currently selected by the user of the client device.

In a further implementation form of the first and/or second aspects, the orientation data comprises at least one member of the group consisting of: a horizontal FOV angle value, a vertical FOV angle value, a yaw value, a roll value and a pitch value, of the client device. The orientation data includes data indicating the FOV currently set at the client device to allow efficient construction of the EFOV frames at the server (apparatus) before delivery to the client device.

In a further implementation form of the first and/or second aspects, the current orientation data of a client device comprises a time stamp. The time stamp may be essential to maintain a synchronized stream of the EFOV frames. The time stamp may be required by the client device to efficiently use the presentation data contained in the EFOV frames for constructing the actual FOV which are adjusted according to updated orientation data.

In a further implementation form of the first and/or second aspects, the EFOV frame is associated with a member of a group consisting of: (i) orientation data, (ii) frame size of a frame designed to be cropped from the EFOV frame and (iii) a frame size in an equirectangular projection format. The additional data may be required by the client device to use the presentation data contained in the EFOV frames for constructing actual FOV which are adjusted according to updated orientation data.

In a further implementation form of the first and/or second aspects, a time stamp and/or the orientation data, associated to the EFOV frame is transmitted to the client device via the network using a member of the group: (i) image data embedded in the frame, (ii) text data added to the frame header (e.g., supplemental enhancement image (SEI) message), and (iii) separate network message consisting an identification code, wherein a corresponding identification code is also associated with the EFOV frame as image data or text data. Supporting multiple delivery protocols for the time stamping information as well as for the additional data may allow deployment of the EFOV technique and protocols in multiple diverse environments, systems and platforms supporting various communication methods, protocols and/or means between the server and the client device.

In a further implementation form of the first and/or second aspects, the processor is further configured to calculate a center of the EFOV frame according to a predicted orientation of the client device calculated based on the current orientation data received in a current iteration and one or more previous iterations of the plurality of iterations. By predicting the orientation of the client device ahead of time, the EFOV frames may be constructed accordingly and delivered to the client device even before receiving the actual (real) updated orientation data from the client device. This may significantly reduce the latency, i.e., a motion to photon (MTP) latency thus significantly improving the QoE.

In a further implementation form of the third and/or fourth aspects, the current orientation data and the updated current orientation data are acquired from a set of one or more orientation sensors, each of the orientation sensors being configured to measure a current orientation of the client device. The sensors may efficiently monitor the location, position, displacement, movement and/or motion of the client device which indicates the FOV selected by the user for viewing the VR 360 video file. The sensory data captured by the sensors may be used to generate accurate and up to date orientation data which may be transmitted to the server (apparatus) for construing the EFOV frames accordingly.

In a further implementation form of the third and/or fourth aspects, the processing unit is configured to convert the EFOV frame or the actual field of view frame from an equirectangular projection format to a rectilinear format before the presentation of the actual field of view frame. Converting the EFOV frames to a standard projection format, for example, the equirectangular projection may facilitate the use of standard equipment, for example, encoders, decoders, display adapters and/or the like as well as standard image and/or video processing tools, applications and/or services to process the EFOV frames.

In a further implementation form of the third and/or fourth aspects, RTT data which is associated with a time stamp is transmitted via the network. The RTT data may be indicative of the QoS of the network via which the client device receives the EFOV frames from the server (apparatus). The RTT may be used by the server to adjust the area (size) of the EFOV frames according to the RTT and provide extra presentation data in the EFOV frames which is sufficient to compensate for the measured RTT.

In a further implementation form of the third and/or fourth aspects, the current orientation data comprises at least one member of the group consisting of: a horizontal field of view (FOV), angle value, a vertical FOV angle value, a yaw value, a roll value and a pitch value. Using the additional data, the client device may properly use the presentation data contained in the EFOV frames for constructing actual FOV which are adjusted according to updated orientation data.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

Figure 1:
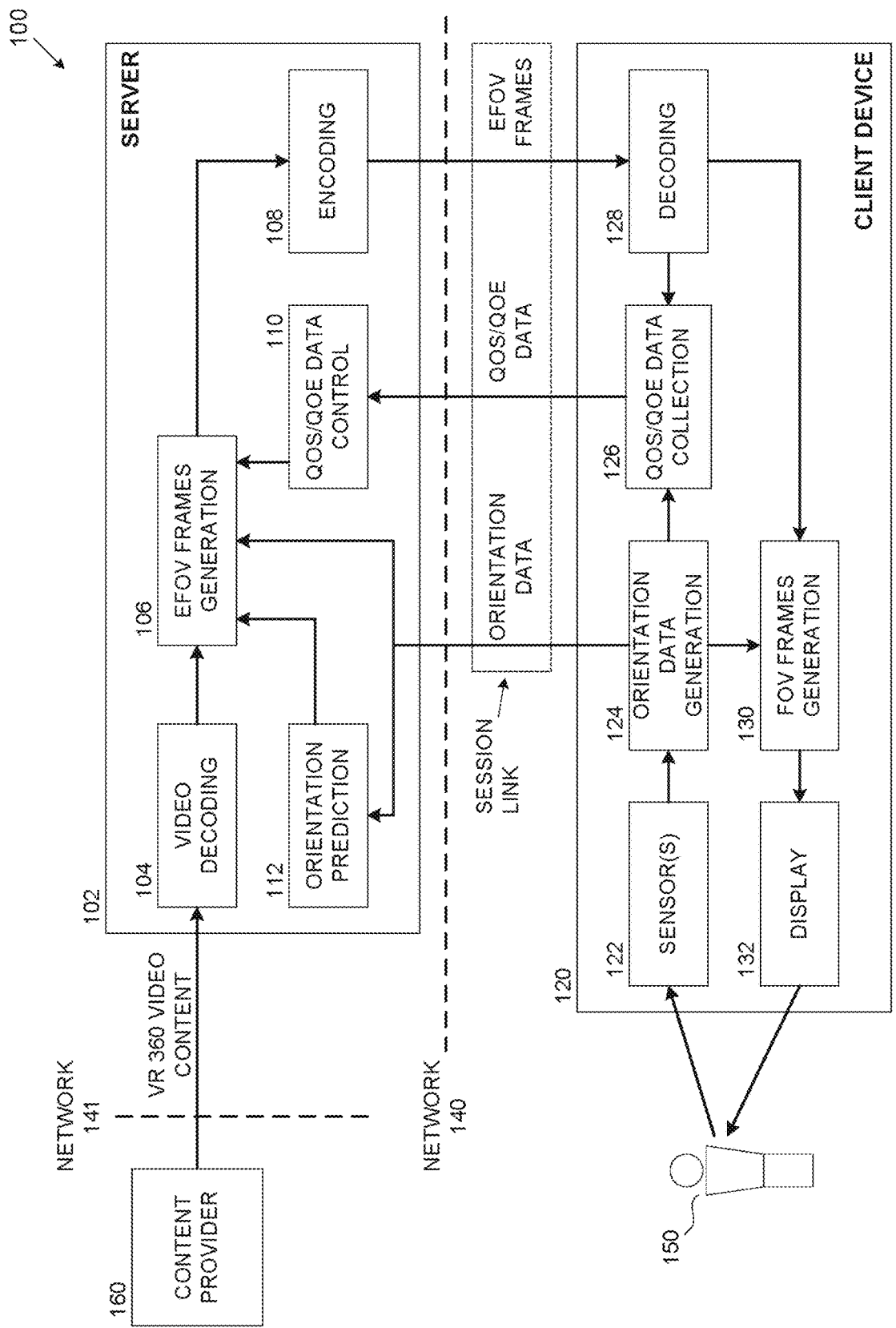
FIG. 1 is a schematic illustration of an exemplary system for delivering VR 360 video content to a client device for presentation to a user, according to some embodiments of the present invention.

DESCRIPTION OF SPECIFIC EMBODIMENTS
OF THE INVENTION

Some embodiments of the present invention relate to streaming VR 360 video content to client devices and, more particularly, but not exclusively, to low latency, high resolution and high throughput VR 360 video content streaming to client devices.

Delivering (streaming) the VR 360 video content, for example, a VR 360 video file and/or the like from a server, for example, a computing node, a cluster of computing nodes, a cloud service and/or the like to a client device, for example, a head mount display (HMD), stereoscopic goggles, a laptop computer, a desktop computer, a mobile device (e.g., smartphone, tablet, etc.) and/or the like for presentation to a user may be highly desirable.

Such VR 360 video content delivery may present significant challenges due to the high data volume of the VR 360 video content. The challenge may further increase when the VR 360 video content is high quality (high resolution), supports high frame rate, includes high motion, includes rapid scene changes and/or the like, thus comprising higher volumes of data.

Transferring the VR 360 video content may therefore require high communication resources, specifically high network bandwidth (throughput) and/or low latency. Moreover, the user viewing (consuming) the VR 360 video content may frequently change his field of view (FOV) on the VR 360 video content. In order to maintain a sufficiently high quality of experience (QoE) for the user, the latency between the FOV changes initiated by the user and adjustment of the presentation of the VR 360 video content accordingly must be significantly low. Such latency may be expressed by the term motion to photon (MTP) latency which indicates the latency between a time of a motion (for selecting the FOV) and the time of presentation of the respective presentation (photon). For client devices supporting 3D presentation (stereoscopic), for example, the HMD, the stereoscopic goggles and/or the like the MTP latency should be extremely low since high MTP latency may cause the user to experience nausea, motion sickness, loss of orientation and/or suffer other undesired effects.

Furthermore, processing, encoding/decoding, and/or generating the VR 360 video content may require high computing resources, for example, processing resources, storage resources, communication resources and/or the like which may present a major limitation, mainly for the client device which may have limited such resources.

According to some embodiments of the present invention, there are provided methods, systems and computer program products for delivering VR 360 video content to client devices while maintaining high throughput of the content delivery and low latency, in particular low MTP latency.

The high throughput VR 360 video content delivery (streaming) is based on two main concepts. The first concept is that at any given time the user may view only a significantly small portion of the overall VR 360 video presentation (frames), typically 90-120 degrees in most client devices and therefore only the relevant portion of the presentation (frame) may be delivered to the client device. The segment of the VR 360 video content frames delivered to the client device may be referred to herein after as extended FOV (EFOV) frames or FOV+ frames. Delivering only a significantly small segment of the VR 360 video content (i.e., the EFOV frames) to the client device may significantly reduce the required network bandwidth. Moreover, delivering the EFOV frames may significantly reduce the computing resources required at the client device to process the received VR 360 video content. The segment of the VR 360 video content (EFOV frames) delivered to the client device is selected according to current orientation data received from the client device. The current orientation data indicates the current orientation of the client device, specifically the current FOV selected by the user to view the VR 360 video content.

The second concept is splitting processing of the VR 360 video content between the server (apparatus) delivering the VR 360 video content and the client device. The Quality of Service (QoS) of the network, i.e., the network latency which may be expressed by Round Trip delay Time (RTT), may significantly reduce the QoE. The server may therefore provide the client device with extra presentation data exceeding the FOV presented and seen by the user (FOV frames). This means that the EFOV frames comprise a larger area (FOV) than their respective FOV frames. The client device may use the extra presentation data to adjust the VR 360 video content presentation according to an updated FOV of the user which may have changed with respect to the original FOV used to generate the EFOV frames. The client device may locally generate the FOV frames according to the updated FOV since the EFOV frames include the extra presentation data. By locally generating the FOV frames, the client device may generate FOV frames according to the updated FOV selected by the user and may therefore compensate for extended RTT and maintain a high QoE even when the RTT is insufficient to do so.

Optionally, the server dynamically adjusts the size, i.e., the area size of one or more of the EFOV frames according to variations in the QoS, specifically in the RTT measured for data transfer between the server and the client device. As such, in case the RTT increases, the server may increase the size of the EFOV frame(s), thus providing more extra presentation data that may be used by the client device to compensate for the increased RTT. On the other hand, in case of low RTT, i.e., good QoS, the server may reduce the size of the EFOV frame(s) thus reducing the required network bandwidth and/or the computing resources required to process the smaller EFOV frame(s).

Optionally, the server predicts the current orientation of the client device by analyzing orientation data previously received from the client device. Using the predicted orientation of the client device, the server may create one or more of the EFOV frames with a center shifted according to the predicted orientation. This may significantly increase the accuracy of the EFOV frames provided to the client device and may further provide the extra presentation data in the predicted directions (areas) which may be used by the client device to generate FOV frames and compensate for potentially high RTT.

Optionally, the server utilizes one or more edge servers which are located at the edge(s) of the network in close communication travel time proximity to the client device, for example, in close proximity to network gateways serving the client device. In such deployment, the server may typically obtain the VR 360 video content requested by the user using the client device from one or more content providers, for example, a content delivery network (CDN), a content provider origin server and/or the like. The edge servers may further utilize one or more cloud services and/or platforms, for example, Amazon Web Service (AWS), Google Cloud, Microsoft Azure and/or the like.

The server may further utilize a low latency encoder for encoding the EFOV frames transmitted to the client device. Moreover, the server may transmit the EFOV frames to the client device using one or more real time media transfer protocols over one or more ultra-low latency encoder-decoder channels to achieve extremely low latency on the network.

The high throughput VR 360 video content delivery may present significant advantages compared to currently existing methods for delivering VR 360 video content.

Some of the existing methods may deliver the entire VR 360 content, for example, the VR 360 video file to the client device. This may require significant network resources, specifically network bandwidth which may be limited in practical application, thus making such methods impractical. Such methods may further require significantly high computing resources at the client device to process, for example, decode, render and/or generate the FOV frames thus increasing the complexity, cost and/or the like of the client device.

The high throughput VR 360 video content delivery on the other hand delivers only a significantly small portion (EFOV frames) of the VR 360 video content thus significantly reducing the required network bandwidth. As the client device process only the EFOV frames which are significantly small compared to the overall VR 360 video content item, the computing resources required at the client device may be significantly reduced which may significantly reduce complexity, cost and/or the like of the client device.

Some of the existing methods, for example, Facebook Pyramid may deliver multiple viewports and/or profiles of the VR 360 video content. In such methods, the presentation area within the current FOV (FOV frame) is delivered at high resolution while the presentation areas outside the current FOV are delivered in low resolution. However, switching between the viewports and/or profiles in response to a change of the FOV as selected by the user may be time consuming and may thus present poor QoE while adjusting to the new FOV and presenting the low resolution content during the switching time. Moreover, such methods may have some shortcomings since they may require significant larger storage at the server side for all visual viewport angles (e.g., 6 times of the original file size). In addition, more computing resources may be required at the client device for managing the selection of the next viewport to be downloaded according to the viewing angle among the various possible viewports in the surrounding of the current viewing angle.

Other existing methods, for example, Fraunhofer HHI may construct the VR 360 video content as tiles also utilizing multiple viewports and/or profiles of the VR 360 video content. In such methods the network bandwidth efficiency may increase with the number of tiles, where construction of the FOV area by high resolution through smaller tile size reduces the extra area outside the FOV. However, the latency may significantly increase and the QoE may thus deteriorate during FOV change since low resolution (lower quality) is observed until the high resolution stream(s) are downloaded. In addition, smaller tile size may increase the bit-rate for each tile as inter and intra prediction area is reduced. Moreover, such methods may require significant computing resources at the client device for both the selection of tiles for the next time interval according to the next viewpoint and the aggregation process that merges individual tile bitstream segments into a viewport dependent bitstream.

In contrast, the high throughput VR 360 video content delivery provides the EFOV frames in high resolution. Moreover, the client device may construct the FOV frames locally using the EFOV frames. Therefore, in case of FOV change of the user, the client device may adjust the FOV frame using the extra presentation data available in the EFOV frames to adapt to the new FOV without intervention of the server. In addition, since a client device needs to process the EFOV frames which constitute a significantly small portion of the overall VR 360 video content, the computing resources of the client device may be significantly reduced.

Furthermore, by deploying the server at the edge of the network the QoS may be significantly improved thus reducing the latency, for example, the RTT between the server and the client device thus significantly improving the MTP and hence the QoE. Moreover, the efficiency of management of the edge servers and/or of the edge networks may be significantly improved, for example, in terms of one or more key performance indicators (KPIs) such as, for example, latency, bandwidth, throughput and/or the like. Applying the low latency encoder for encoding the EFOV frames transmitted to the client device may significantly reduce the latency for the VR 360 video content delivery. The latency may be further reduced by using the real time media transfer protocol(s) over the ultra-low latency encoder-decoder channels.

In addition, by dynamically adapting the size of the EFOV frames according to the RTT, the high throughput VR 360 video content delivery may adjust to variations in the RTT, i.e., in the QoS supported by the network serving the client device.

Also, by predicting the current and/or future orientation of the client device, i.e., the FOV selected by the user, the EFOV frames may be constructed, for example, centered to provide the additional presentation data according to the predicted orientation. As such the EFOV frames may be constructed even before receiving the actual (real) updated orientation data from the client device. This may significantly reduce the latency, i.e., the MTP thus significantly improving the QoE.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Aspects of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 illustrates a schematic illustration of an exemplary system for delivering VR 360 video content to a client device for presentation to a user, according to some embodiments of the present invention. An exemplary system 100 may include a server 102 used for streaming VR 360 video content, i.e., for delivering the VR 360 video content over a network 140 to a client device 120 for presentation to a user 150. For brevity a single client device 120 is presented in the system 100 and discussed hereinafter, however this should not be construed as limiting as the VR 360 video content may be delivered (streamed) to a plurality of client devices such as the client device 120.

Delivering the VR 360 video content to the client device 120 may present significant challenges, specifically in terms of significant resources required from the network 140, specifically bandwidth (throughput) and/or latency. As the VR 360 video content, for example, VR 360 video files and/or the like, in particular high quality (high resolution) and/or high motion VR 360 video content comprises high volumes of data, the network bandwidth needs to be sufficiently high to support the delivery of such large data volumes. In addition, the user experience of the user 150 which may be expressed by, for example, MTP latency and/or the like should be sufficiently low, thus requiring significantly low network latency for the VR 360 video content received at the client device 120.

The system 100 may address these challenges by splitting the generation of the VR 360 video content presented to the user 150 between the client device 120 and a server 102, for example, a computing node, a cluster of computing nodes and/or any processing device having one or more processors.

The splitting of the processing and/or generation of the VR 360 video between the server 102 and the client device 120 is done such that the server 102 crops only relevant segments of the VR 360 video renders them and transmits them to the client device 120 through the session link established over the network 140. The cropped segments of the VR 360 are selected by the server 102 according to orientation data received over the network 140 from an orientation data generation module 124 at the client device 120 which generates the orientation data according to sensory data provided by one or more sensors 122 of the client device 120. The orientation data indicates the current orientation of the client device 120 which represents the Field of View (FOV) selected by the user 150 presented with the VR 360 video presentation.

This implementation may significantly reduce the network bandwidth required for delivering the VR 360 video to the client device 120 since only a significantly small segment of the overall VR 360 video is transmitted during each of a plurality of iterations of the delivery (streaming) session. Moreover, this may significantly reduce the computing resources required at the client device 120 for processing the VR 360 video, for example, decoding, rendering, generating and/or the like since only the segment of the VR 360 video is processed during each of the iterations.

Naturally, the user 150 may change the selected FOV, for example, change a location of the center of FOV, increase the FOV (zoom-out), decrease the FOV (zoom-in) and/or the like. The VR 360 video segment may therefore need to be updated accordingly, i.e., the server 102 may need to generate new VR 360 video segments. In order to maintain a sufficiently high user experience the latency of the network 140 may be compensated by locally adjusting the VR 360 video at the client device 120. To support this, the server 102 generates the segments of the VR 360 video as extended FOV (EFOV, also referred to as FOV+) frames (EFOV frames generation module 106) which encompass a larger FOV area than the FOV area presented to the user 150 by the display of 132. The EFOV frames thus comprise additional presentation data compared to their respective FOV frames presented by the display 132. The additional presentation data may thus serve as a buffer and may be used by the client device 120 to locally generate updated FOV frames (FOV frames generation 130) according to updated orientation data obtained from the orientation data generation module 124. The FOV frames may then be presented to the user 150 by a display 132 of the client device 120. This may significantly reduce and/or completely avoid the need of the client device 120 to wait for the new EFOV frames created by the server 102 in response to the client device 120 orientation change(s), i.e., according to the updated orientation data.

As the presentation data of the additional (extra) area of the EFOV frames may be used by the client device 120 to adjust the FOV frames according to the updated orientation data obtained, the additional (extra) area of the EFOV frames practically compensates for the latency of the network 140. Therefore, to efficiently serve as the buffer, the size of the EFOV frames may be defined according to the latency of the network 140. Specifically, the size of the EFOV frames may be defined according to a Round Trip delay Time (RTT) expressing the time for a signal and/or a message to travel from the server 102 to the client device 120 and back (acknowledgment from the client device 120).

The extra area of the EFOV frame may be designated by $\text{Diff}_{size}$ and the maximum time delay that may be compensated for with the presentation data of the $\text{Diff}_{size}$ be designated $T_{comp}$. The relation between the $\text{Diff}_{size}$ the $T_{comp}$ may be used to define the $\text{Diff}_{size}$ according to a given RTT. The $\text{Diff}_{size}$ may further be adjusted according to capabilities of the client device 120, for example, supporting a 2D presentation/3D presentation, display size, display resolution and/or the like.

The time delay $T_{comp}$ may thus be defined by the maximum allowed latency that may be compensated by the presentation data of the extra area $Diff_{size}$ for a given maximum angular velocity of the client device 120 as presented in equation 1 below.

$$T_{comp} = \frac{Diff_{Size}[deg]}{MxAnS[deg/ms]} \quad \text{Equation 1}$$

where $Diff_{size}$ [deg] is a one-side extra range in one EFOV frame and MxAnS [deg/ms] is the maximum angular velocity.

For example, assuming a 10 degrees extra area in each direction, i.e., $Diff_{size}=10°$, and $$MxAnS = 1.0°/ms, \; T_{comp} = \frac{10°}{1.0°/ms} = 10 \text{ ms.}$$

In such case an RTT of 10 ms may be compensated for by the client device 120 using the presentation data of the extra area of the EFOV frame.

In another example, assuming a 10 degrees extra area in each direction, i.e., $Diff_{size}=10°$, and $$MxAnS = 0.2°/ms, \; T_{comp} = \frac{10°}{0.2°/ms} = 50 \text{ ms.}$$

In such case an RTT of 50 ms may be compensated for by the client device 120 using the presentation data of the extra area of the EFOV frame.

Figure 2:
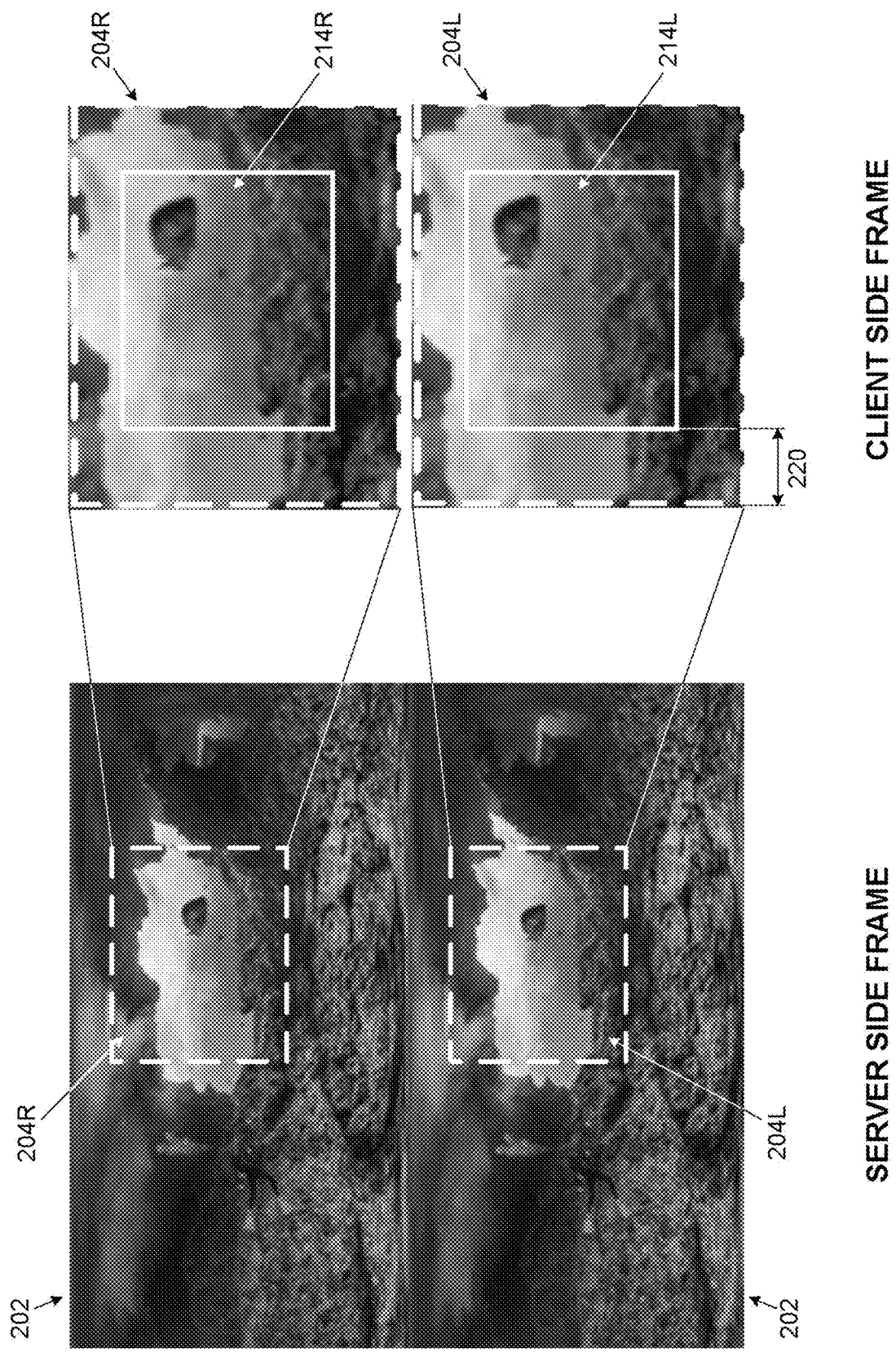
FIG. 2 is a schematic illustration of an exemplary VR 360 video frame generated from a respective extended field of view (EFOV) frame, according to some embodiments of the present invention.

Reference is now made to FIG. 2, which is a schematic illustration of an exemplary VR 360 video frame generated from a respective EFOV frame, according to some embodiments of the present invention. An exemplary VR 360 video 202 may be processed, for example, cropped, rendered and/or the like by a server such as the server 102 according to the orientation data received from a client device such as the client device 120. Naturally, the server 102 processes the VR 360 video 202 according to the capabilities of the client device 120 which may be relayed to the server 102 at the start of the session. In the presented example, the client device 120 may be, for example, an HMD, a stereoscopic goggles and/or the like supporting 3D presentation. The server 102 may therefore generate two EFOV frames 204R and 204L where the EFOV frame 204R is configured for a right eye presentation at a display of the client device 120 and the EFOV frame 204L is configured for a left eye presentation at the display of the client device 120. The server 102 may transmit the EFOV frames 204R and 204L to a client device such as the client device 120. The client device 120 may further process, for example, crop, render and/or the like the received EFOV frames 204R and 204L to generate respective FOV frames 214R and 214L according to updated orientation data indicating a change in the orientation of the client device 120.

Moreover, an exemplary one-side extra area 220 presents the extra area of the EFOV frame $Diff_{Size}$ which is defined per side of the EFOV frame as described herein above.

Reference is made once again to FIG. 1.

Optionally, the server 102 generates the EFOV frames according to the Quality of Service (QOS) and/or Quality of Experience (QOE) which is typically derived from the latency of the network 140. The latency, specifically the RTT may be monitored, calculated and/or reported by a QOS/QOE Control module 110. The server 102 may adjust dynamically the size of the EFOV frame, specifically, the $Diff_{Size}$ according to variations in the RTT. The QOS/QOE data control module 110 may obtain QoS (Quality of Service) and/or QoE (Quality of Experience) information from a QoS/QoE data collection module 126 at the client device 120.

Optionally, the server 102 generates the EFOV frames according to an orientation prediction module 112 which may predict updates to the orientation of the client device 120 selected by the user 150. The orientation prediction module 112 may be based on the current orientation data received from the orientation data generation module 124 at the client device 120 and may be further based on orientation data received during one or more previous iterations of the session.

In order to further reduce the latency (e.g., few milliseconds) and/or increase bandwidth (throughout) of the network 140, the server 102 may utilize one or more edge servers which are located at the edge(s) of the network 140 in close communication travel time proximity to the client device 120, specifically in close proximity to network gateways serving the client device 120. Such deployment of the server 102 may significantly reduce the latency, i.e., the travel time of data messages and packets exchanged between the server 102 and the client device 120. This deployment may also significantly reduce the network bandwidth, i.e., utilization of the network 140 for exchanging the VR 360 video content and associated data between the server 102 and the client device 120. In some embodiments of the present invention, the server 102 may be provided through one or more cloud computing services, platform and/or resources, such as, for example, proprietary server, IBM uCloud, Amazon Web Service (AWS), Google Cloud, Microsoft Azure and/or the like.

The server 102 may typically obtain one or more VR 360 video content items, for example, a VR 360 video file from one or more content providers 160, for example, a Content Delivery Network (CDN), a content provider origin server and/or the like. The server 102 may communicate with the content provider(s) 160 via one or more networks 141. Since the content provider(s) 160 may be significantly remote from the client device 120 with respect to the travel time, for example, the content provider origin server(s), a data center and/or the like the network 141 may not necessarily be a significantly low latency and/or high throughput network. However, in some embodiments the network 140 and the network 141 may share one or more of the networks.

The server may apply a video decoding module 104 to decode the received VR 360 video content. The video decoding module 104 may support one or more encoding protocols, specifically video encoding protocols, for example, MPEG, H.264, H.265, H.266 and/or the like. The video decoding module 104 optionally applies one or more hardware encoding circuits, for example, an application specific integrated circuit (ASIC), a field programmable gate array (FPGA), a digital signal processor (DSP), a graphic processing Unit (GPU) and/or the like to decode the received VR 360 video.

Figure 3:
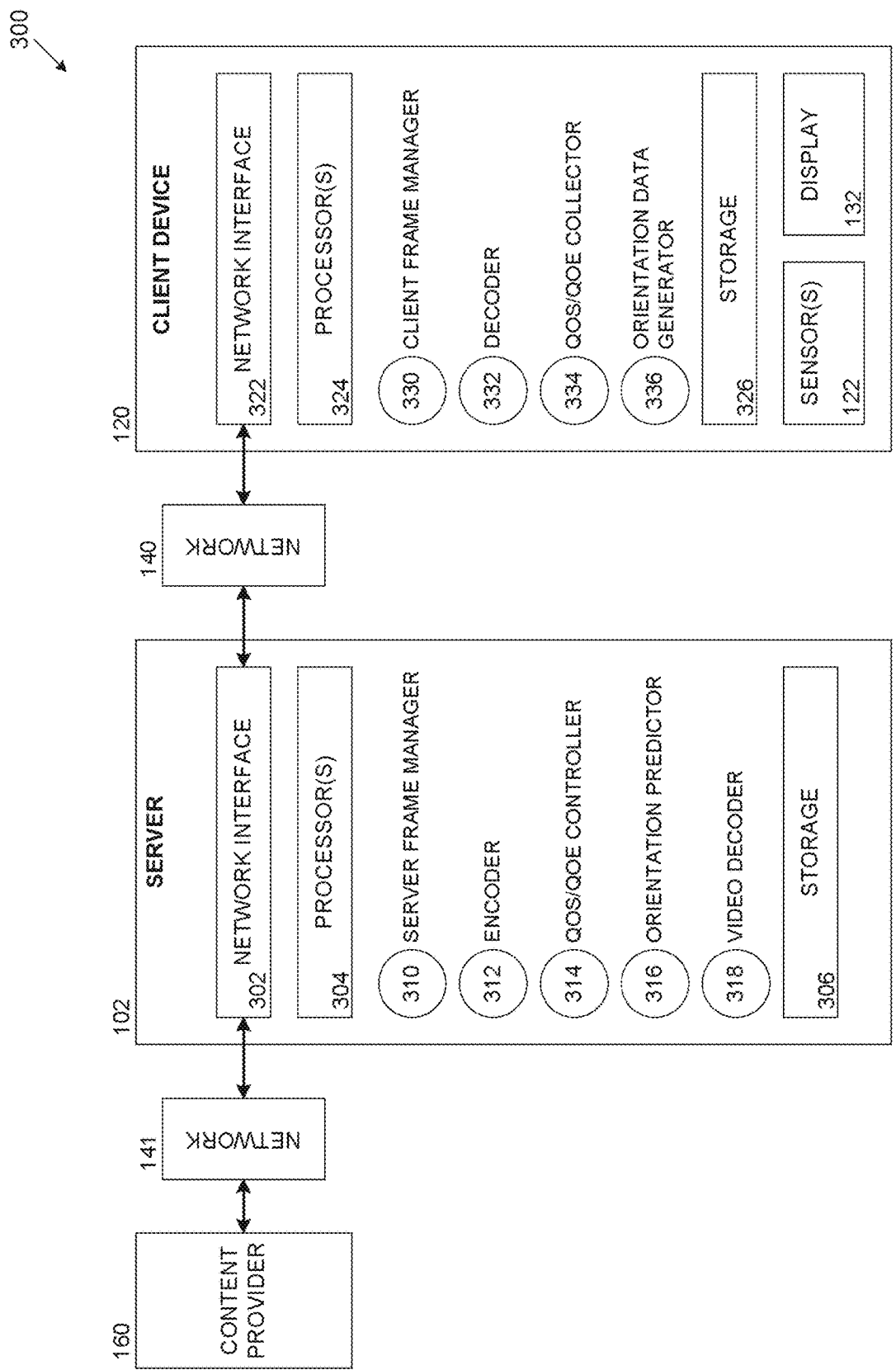
FIG. 3 is a schematic illustration of an exemplary server used for delivering VR 360 video content to an exemplary client device for presentation to a user, according to some embodiments of the present invention.

Reference is also made to FIG. 3, which is a schematic illustration of an exemplary server used for delivering VR 360 video content to an exemplary client device for presentation to a user, according to some embodiments of the present invention. An exemplary server such as server 102 may deliver (stream) VR 360 video content to a client device such as the client device 120 for presentation to a user such as the user 150.

The server 102 may communicate with the client device 120 via a network such as the network 140 comprising one or more wired and/or wireless networks, for example, a local area network, (LAN), a wide area network (WAN), a cellular network, a wireless LAN (WLAN) and/or the like. The client device 120 may establish a video streaming session with the server 102 to receive the VR 360 video content using one or more communication links, specifically video streaming links, for example, a transport link and/or the like. The server 102 may further communicate with one or more content providers such as the content provider 160 via a network such as the network 141 comprising one or more wired networks, for example, a LAN, a WAN, the Internet. As discussed herein before, the server 102 may preferably utilize one or more edge servers in order to further reduce the latency and/or increase bandwidth of the network 140 used for communicating with the client device 120. The network 141 on the other hand may not necessarily be a significantly low latency and/or high throughput network. However, in some embodiments the network 140 and the network 141 may share one or more of the networks.

The server 102, for example, a computing node, a cluster of computing nodes and/or any processing device having one or more processors comprises a network interface 302 comprising one or more network interfaces for connecting to the network 140 and/or the network 141, a processor(s) 304 and storage 306. The processor(s) 304, homogenous or heterogeneous, may include one or more processors arranged for parallel processing, as clusters and/or as one or more multi core processor(s). The storage 306 may include one or more non-transitory persistent storage devices, for example, a hard drive, a Flash array and/or the like. The storage 306 may further comprise one or more network storage devices, for example, a storage server, a network accessible storage (NAS), a network drive, and/or the like. The storage 306 may typically include one or more volatile devices, for example, a random access memory (RAM) component and/or the like.

The client device 120, for example, a desktop computer, a laptop computer, a mobile device (e.g., a smartphone, a tablet, etc.), an HMD, a stereoscopic goggles and/or the like may comprise a network interface 322 for connecting to the network 140, a processor(s) 324, storage 326, one or more sensors 122 and a display 132. The storage 326 may include one or more non-transitory persistent storage devices, for example, a hard drive, a Flash array and/or the like. The storage 326 may typically include one or more volatile devices, for example, a random access memory (RAM) component and/or the like.

The display 132 may support 2D presentation and/or 3D presentation to a user 150. For example, client devices 120 such as the HMD, the stereoscopic goggles and/or the like may typically include a 3D display (screen) supporting the 3D presentation and optionally the 2D presentation. Other client devices 120, for example, the desktop computer, the laptop computer, the smartphone, the tablet and/or the like may typically include a flat 2D display (screen) supporting the 2D presentation.

The sensor(s) 122 may be configured to monitor and capture the current orientation of the client device 120 and provide sensory data accordingly. The type, functionality, characteristics and/or the like of the sensor(s) 122 may naturally depend on the type and nature of the client device 120. For example, for the client device 120 such as the HMD, the stereoscopic goggles and/or the like, the sensor(s) 122 may include, for example, an accelerometer, a gyroscope, an inertial measurement unit (IMU), a laser position sensor, an imaging sensor and/or the like configured to monitor and capture gestures of the user, for example, head gestures, hand(s) gestures, bodily gestures/movements and/or the like which may indicate the orientation of the client device 120 as selected by a user 150. In another for the client device 120 such as the desktop computer, the laptop computer, the smartphone, the tablet and/or the like, the sensor(s) 122 may include, for example, an accelerometer, a gyroscope, an IMU and/or the like configured to monitor and capture the orientation of the client device 120. For such client devices 120, the sensor(s) 122 may further be utilized by a pointing device, for example, a mouse, a touchpad, a touch screen and/or the like through which the user 150 may select the orientation of the VR 360 video presentation.

The client device 120 may apply orientation data generation module 124 to analyze the sensory data provided by the sensor(s) 122 in order to identify a current orientation of the client device 120 and produce the current orientation data which indicates that current orientation of the client device 120. The current orientation expresses the FOV selected by the user 150 to view the VR 360 video presented by the display 132. The orientation data may be transmitted from the client device 120 to the server over the session link established over the network 140.

The server 102, specifically the processor(s) 304, may execute one or more software modules, for example, a process, an application, an agent, a utility, a script, a plug-in and/or the like. Wherein a software module may comprise a plurality of program instructions executed by a processor such as the processor(s) 304 from a storage such as the storage 306. For example, the server 102 may execute a server frame manager 310, an encoder 312, a QOS/QOE controller 314, an orientation predictor 316, a video decoder 318 and/or the like.

The server frame generator 310 may control the EFOV frames generation module 106 at the server 102 for generating the EFOV frames. The server frame generator 310 may optionally use one or more hardware processing circuits, for example, a GPU, a DSP, an image processor and/or the like to generate the EFOV frames.

The encoder 312 may control the encoding module 108 at the server 102 for encoding the EFOV frames and transmitting them to the client device 120. The encoder 312 may be configured to support one or more encoding protocols, specifically video encoding protocols, for example, MPEG, H.264, H.265, H.266 and/or the like. The encoder 312 may optionally use one or more hardware encoding circuits, for example, an ASIC, an FPGA, a DSP and/or the like to encode and/or transmit the EFOV frames. The encoder module 312 may be further configured to support low delay encoding profile and/or algorithm.

The QOS/QOE data controller 314 may control the QOS/QOE data control module 110 for generating the QoS/QoE data relating to the VR 360 video session, specifically the EFOV frames received at the client device 120. The QOS/

QOE data controller 314 may generate the QoS/QoE data according to QoS and/or QoE data received from the QOS/QOE data collector 334 at the client device 120.

The orientation predictor 316 may control the orientation prediction module 112 for predicting orientation changes (updates) of the client device 120.

The video decoder 318 may control the video decoding module 104 of the server 102 to decode the VR 360 video content obtained from the content provider(s) 160. The video decoder 318 may be configured to support one or more of the encoding protocols, specifically the video encoding protocols, for example, MPEG, H.264, H.265, H.266 and/or the like. The video decoder 318 may optionally use one or more hardware encoding circuits, for example, a GPU, an ASIC, an FPGA, a DSP and/or the like to decode the VR 360 video content.

Similarly, the client device 120, specifically the processor(s) 324 may execute one or more software modules comprising a plurality of program instructions executed by a processor such as the processor(s) 324 from a storage such as the storage 326, for example, a client frame manager 330, a decoder 332, an orientation data collector 336 and/or the like.

The client frame generator 330 may control the FOV frames generation 130 at the client device 120 for generating the FOV frames. The client frame generator 330 may optionally use one or more hardware processing circuits, for example, a GPU, a DSP, an image processor and/or the like to generate the FOV frames. The client frame generator 330 may further instruct the display 132 to present the generated FOV frames.

The decoder 332 may control the decoding module 128 at the client device 120 to decode the EFOV frames received from the server 102. The decoder 332 may be configured to support one or more of the encoding protocols, specifically the video encoding protocols, for example, MPEG, H.264, H.265, H.266 and/or the like. The decoder 332 may optionally use one or more hardware encoding circuits, for example, a GPU, an ASIC, an FPGA, a DSP and/or the like to decode the EFOV frames. The decoder 332 may be further configured to support low delay decoding profile and/or algorithm.

The QOS/QOE data collector 334 may control the QOS/QOE data collection module 126 for collecting the QOS/QOE data relating to the VR 360 video session, specifically the EFOV frames received from server 102. For example, the QOS/QOE data collector 334 may identify latency of traffic on the network 140 between the server 102 and the client device 120 by analyzing time stamps associated with the EFOV frames. The QOS/QOE data collector 334 may further identify the MTP (indicative of the QoE) by analyzing time stamps of the orientation data used to construct the received EFOV frames.

The orientation data generator 336 may control the orientation data generation module 124 for collecting the sensory data from the sensor(s) 122 and generating the orientation data for the client device 120. The orientation data generator 336 may optionally use one or more hardware processing circuits, for example, an ASIC, an FPGA, a DSP and/or the like to collect, analyze and/or generate the orientation data.

Figure 4:
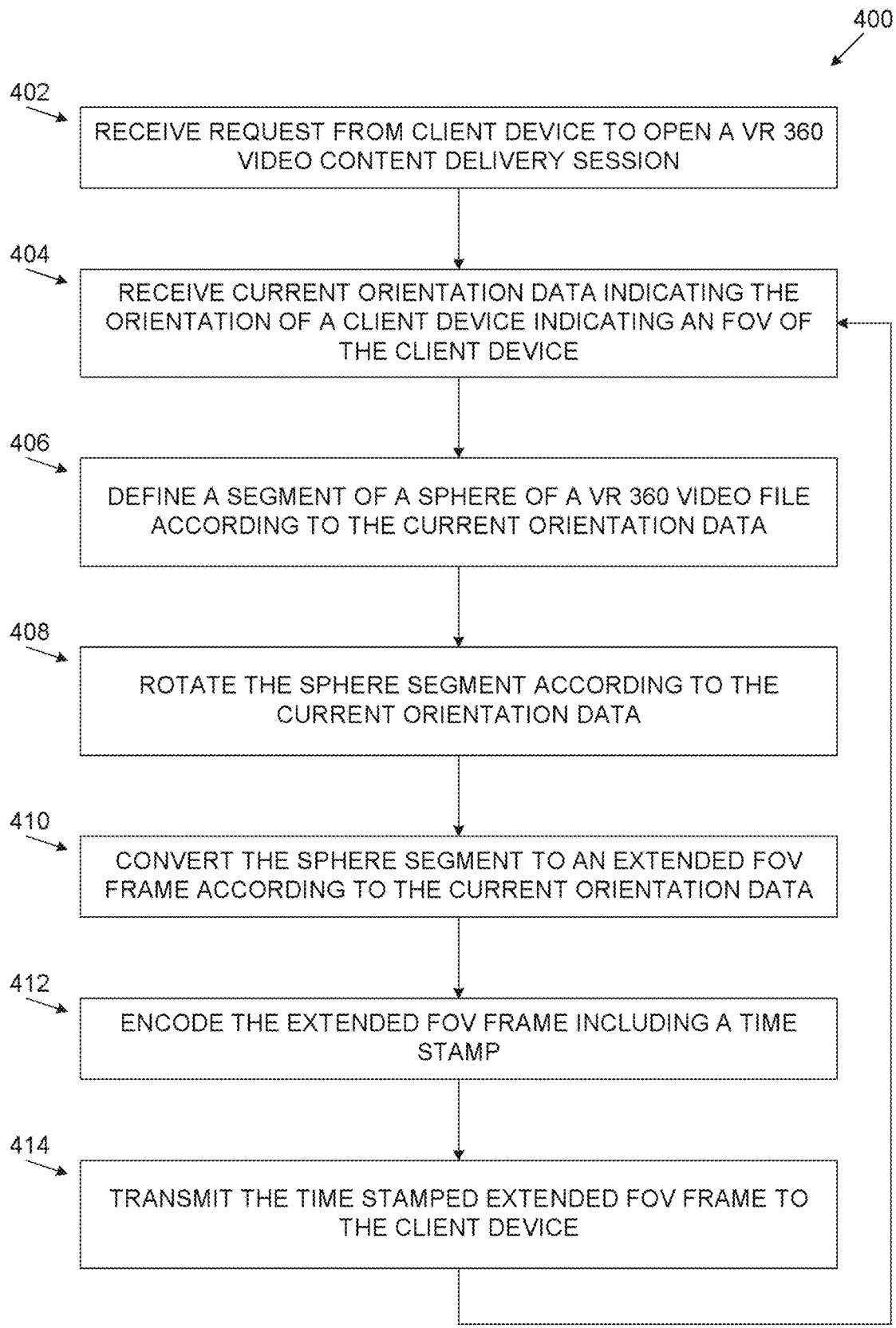
FIG. 4 is a flowchart of an exemplary process executed by a server for creating and delivering VR 360 video frames to a client device, according to some embodiments of the present invention.

Reference is now made to FIG. 4, which is a flowchart of an exemplary process executed by a server for creating and delivering VR 360 video frames to a client device, according to some embodiments of the present invention. An exemplary process 400 may be executed by a server (apparatus) such as the server 102 to provide VR 360 video content to one or more client devices such as the client device 120. The process 100 may be controlled by a server frame manager such as the server frame manager 310.

As shown at 402, the process 400 may start with the server frame manager 310 receiving a request to open and establish a communication session with the client device 120 via the network 140 for providing (streaming) VR 360 video content, for example, a certain VR 360 video file and/or the like.

In response to the VR 360 video content streaming request, the server frame manager 310 may obtain (i.e., download) the requested VR 360 video content from one or more content providers such as the content provider 160. The server frame manager 310 may download the entire requested VR 360 video content from the content provider 160 via a network such as the network 141 and temporarily store it locally at the server 102, for example, in storage such as the storage 306. Additionally, and/or alternatively, the frame manager 310 downloads segments of the requested VR 360 video content which are relevant for delivery to the client device 120. As such, the frame manager 310 may download the relevant segments of the requested VR 360 video content simultaneously with the streaming and delivery of the requested VR 360 video content to the client device 120. A video decoder such as the video decoder 318 may decode the VR 360 video content received from the content provider 160.

The communication session may utilize a session link over a network such as the network 140, for example, a transport link, a transmission link and/or the like using one or more video content delivery (streaming) protocols, for example, MPEG, H.264, H.265 and/or the like. The session link may support exchange of data, control data, messages and/or the like between the server 102 and the client device 120. The session link may be used by the server 102 to deliver the frames of VR 360 video file to the client device 120. The session link may further be used by the server 102 and/or the client device 120 to issue control commands, for example, open, close, start, pause, play, resume and/or the like with respect to the provided VR 360 video content.

At the beginning of the session, the server frame manager 310 may receive from the client device 120 operational information, in particular, capabilities of the client device 120 with respect to consumption and/or streaming of the VR 360 video. For example, the client device 120 may report its available network resources (e.g., bandwidth, etc.), available computing resources, available storage resources and/or the like. The client device 120 may further provide operational information relating to a display such as the display 132 of the client device 120, for example, 2D presentation support, 3D presentation support, display size, display resolution and/or the like. The client device 120 may also provide operational information relating to interaction capabilities of a user such as the user 150 with the client device 120, for example, a maximal angular velocity supported and/or allowed for the client device 120 and/or the like.

At the start of the session, the client device 120 may further report, define and/or negotiate a selected projection format, for example, equirectangular projection (ERP), rectilinear projection, cubemap (CMP), equal-area (EAP), octahedron (OHP) and/or the like. At this time, the client device 120 may also report, define and/or negotiate a selected format of time stamping, a selected coordinate system, a selected angle format and/or the like which may be used during the VR 360 content streaming session.

As shown at 404, the server frame manager 310 may receive current orientation data from the client device 120 indicating a current orientation of the client device 120, specifically indicating a current FOV selected by a user such as the user 150 for viewing the frames of the VR 360 video file presented by the display 132. The current orientation data may include positioning information, for example, a horizontal FOV angle value, a vertical FOV angle value, a yaw value, a roll value and a pitch value, of the client device. The current orientation data may typically include a time stamp assigned to the current orientation data by the client device 120 where each time stamp indicates a capture time of the associated orientation data.

Optionally, the server frame manager 310 receives QoS, for example the RTT and/or the like and/or QoE information, for example, the MTP and/or the like from the client device 120.

As shown at 406, the server frame manager 310 may define a segment of a sphere of the VR 360 video file according to the received current orientation data.

The size, i.e., the area of the segment of the sphere may naturally depend on the size of the EFOV which is to be generated and delivered to the client device 120. This may be extracted from the angles of the EFOV. This may be defined according to one or more parameters of the network 140 and/or of the client device 120, for example, the RTT of the session link between the server 102 and the client device 120, the maximum angular velocity defined for the client device 120, a maximum velocity of displacement in the current orientation data and/or the like.

The area size of the segment of the sphere may further depend on the type of the projection format selected for delivery to the client device. The projection format may include for example, ERP, rectilinear projection, CMP, EAP, OHP and/or the like. While the ERP projection format is presented herein after, it should not be construed as limiting since other projection formats may be used for embodiments of the present invention.

The frame manager 310 may therefore define the size of the EFOV to be generated and delivered to the client device 120, i.e., the EFOV width and the EFOV height according to:

values of FOV angles, i.e., a horizontal FOV angle value and a vertical FOV angle value; and dimensions of the ERP frame to be produced from the segment of the sphere.

The server frame manager 310 may also define the grid points (m,n) of the EFOV frame to be generated and delivered to the client device 120.

The server frame manager 310 may then project the grid points (m,n) on the sphere of the VR 360 video file as follows: $(m,n) \rightarrow (u,v) \rightarrow (\phi, \theta) \rightarrow X', Y', Z'$.

Where, (m,n) is the column and row coordinates of the sampling point in a 2D (u,v) plane, u and v are in the range [0, 1] and W and H are the width and height of the ERP image respectively. The conversion from (m,n) to (u,v) is given by:

$$u=(m+0.5)/W \ 0<=m<W$$

$$v=(n+0.5)/H \ 0<=n<H$$

Figure 5:
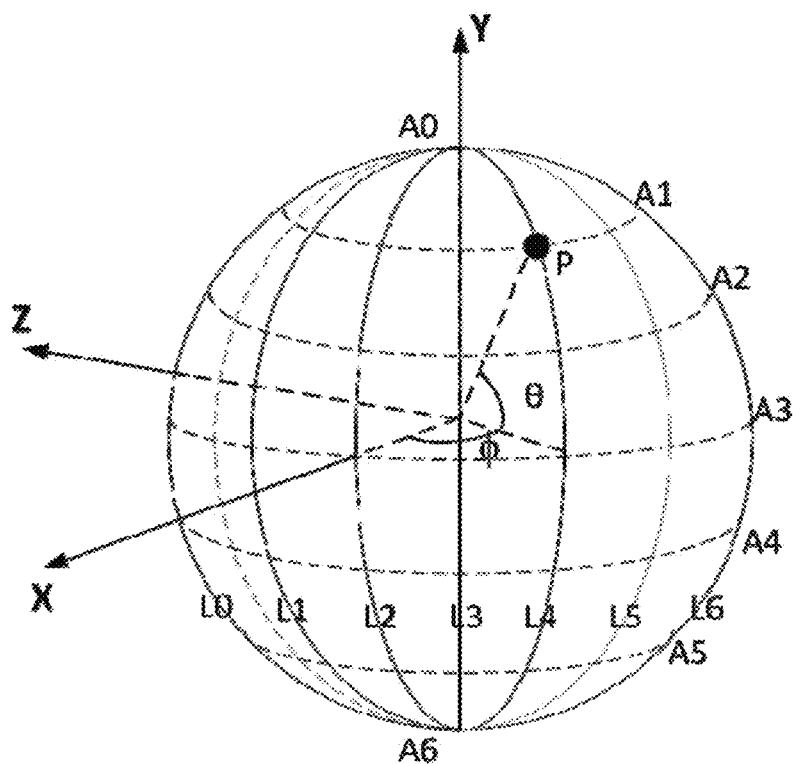
FIG. 5 is a schematic illustration of a Euler angles coordinate system.

The conversion from the (u,v) plane to the longitude ($\phi$) and latitude ($\theta$) angles of the sphere, which are shown in FIG. 5, is given by:

$$\phi=2\pi(u-0.5)$$

$$\theta=2\pi(0.5-v)$$

Where $\phi$ is in the range $[-\pi, \pi]$, measured counterclockwise (CCW) from the X axis, and $\theta$ is in the range $[-\pi/2, \pi/2]$, measured from the equator towards the Y axis.

The conversion from ($\phi$, $\theta$) to (X', Y', Z') coordinates on a unit sphere is given by:

$$X'=\cos(\theta)\cos(\phi)$$

$$Y'=\sin(\theta)$$

$$Z'=-\cos(\theta)\sin(\phi)$$

As shown at 408, the server frame manager 310 may rotate the segment of the sphere to align the segment of the sphere with the FOV selected by the user 150 and indicated by the current orientation data received from the client device 120.

The sphere of the VR 360 video file may be defined using one or more coordinate systems, for example, the Euler angles and/or the like.

Reference is now made to FIG. 5, which is a schematic illustration of a Euler angles coordinate system. The Euler angles coordinate system as known in the art defines yaw, pitch and roll which may be used to specify the relative rotation between a source and destination 3D coordinates. Yaw (which may be expressed as $\phi+\pi/2$) specifies the counterclockwise rotation in degrees along the Y axis, pitch (which may be expressed as $-\theta$) specifies the counterclockwise rotation in degrees along -Z axis and roll (which may be expressed as ti) specifies the counterclockwise rotation in degrees along the X axis.

Reference is made once again to FIG. 4.

The server frame manager 310 may use a rotation matrix to rotate the sphere, specifically the segment of the sphere, according to the current orientation data, specifically, the yaw, pitch and roll values in order to align Z axis of the sphere with the Z axis of the FOV of the user 150.

The server frame manager 310 may apply the following conversion for the rotation:

$$[X,Y,Z]=R_{XYZ}[X',Y',Z']$$

Where $R_{XYZ}=R_Y(yaw_{server}) \cdot R_Z(-pitch_{server}) \cdot R_X(roll_{server})$, where ($yaw_{server}$, $-pitch_{server}$, $roll_{server}$) are the yaw, pitch and roll values received by the frame manager 310 from the client device 120.

Following the rotation, the pixels of the EFOV frame sphere may be efficiently enclosed by a rectangle as known in the art.

As shown at 410, the server frame manager 310 may convert the rotated segment of the sphere to an EFOV frame in one of a plurality of projection formats.

The server frame manager 310 may first crop the EFOV frame from the rotated according to the current orientation data, for example, according to the dimensions of the FOV received from the client device 120. The server frame manager 310 may apply the conversion as follows X, Y, $Z \rightarrow (\phi_r, \theta_r) \rightarrow (u_r, v_r) \rightarrow (m_r, n_r)$ to generate the EFOV frame in ERP format.

The conversion from (X,Y,Z) coordinates to the longitude and latitude ($\phi_r$, $\theta_r$) is given by:

$$\phi_r = \arctan(-Z/X)$$

$$\theta_r = \arcsin\left(\frac{Y}{\sqrt{X^2 + Y^2 + Z^2}}\right)$$

The conversion from ($\phi_r$, $\theta_r$) coordinates to ($u_r$, $v_r$) plane is given by:

$$u_r=\phi_r/(2\pi)+0.5$$

$$v_r=0.5-\theta_r/\pi$$

The conversion from $(u_r, v_r)$ to the point $(m_r, n_r)$ $$m_r = u_r * W - 0.5$$

$$n_r = v_r * H - 0.5$$

The server frame manager 310 may then convert the cropped segment of the sphere to create the EFOV frame in one of the plurality of projection formats, for example, ERP, rectilinear projection, CMP, EAP, OHP and/or the like.

The server frame manager 310 may further interpolate ERP samples from neighboring points around $(m_r, n_r)$ to the EFOV grid point (m,n). The interpolation may be needed since $(m_r, n_r)$, which is a result of the projection from the sphere points (X,Y,Z) to point on the destination ERP plane, may not be located at grid point of the ERP frame. A more efficient alternative may be to first apply the interpolation at the source plane, i.e., ERP plane before the rotation by $R_{XYZ}$. In this alternative these grid points are at the neighborhood of the inverse projection (and inverse rotation) point, which does not necessary fall at a grid point.

Optionally, the server frame manager 310 further converts one or more of the EFOV frames from the ERP format to rectilinear format.

As shown at 412, an encoder such as the encoder 312 may encode the generated EFOV frames using one or more encoding protocols, specifically video encoding protocols, for example, MPEG, H.264, H.265, H.266 and/or the like.

The encoder 312 may further associate (include) additional data to one or more of the EFOV frames, for example, a time stamp, EFOV frame(s) status data, the respective current orientation data used to produce the EFOV frame, the time stamp of the respective current orientation data and/or the like. The EFOV status data may include, for example, FOV data which may be expressed according to the coordinates system used by the server frame manager 310 and the client device 120, for example, assuming the Euler angles system, the FOV status data may be expressed through an FOV yaw value, an FOV pitch value and an FOV roll value. The EFOV status data may also include the dimensions, for example, a width, a height and/or the like of the EFOV frame sphere segment. The EFOV status data may further include the dimensions, for example, the width, the height and/or the like of EFOV frame in the selected projection format, for example, the ERP format, the rectilinear format and/or the like. In addition, the EFOV status data may include the dimensions, for example, the width, the height and/or the like of a frame to be cropped from the EFOV frame at the client device 120 for presentation to the user 150 by the display 132.

The encoder 312 may encode the additional data using one or more techniques and/or implementations. For example, the encoder 312 may embed additional data of one or more of the EFOV frames in the respective EFOV frame itself, i.e., as part of the encoded EFOV frame data. In another example, the encoder 312 may add the additional data as metadata, for example, text data and/or the like, included in one or more headers of the EFOV frame. The encoder 312 may naturally add the metadata and/or text data to the header(s) of the EFOV frame and/or of the encoded stream according to the selected video encoding protocol. In another example, the encoder 312 may encode the additional data in one or more separate streams transmitted to the client device 120 via the network 140 separately from the encoded stream carrying the EFOV frame(s). The separately transmitted additional data is associated with its respective EFOV frame(s), for example, by assigning the additional data and identification code (ID) corresponding to the respective EFOV frame.

Optionally, the encoder 312 employs a low-latency encoder, for example, a hardware circuit specifically designed and deployed to efficiently encode the EFOV frames stream according to the selected video encoding protocol. This may significantly reduce the latency between the time of generating the EFOV frames at the server 102 and the time of decoding and presenting the frames at the client 120.

As shown at 412, the encoder 312 may transmit the encoded EFOV frames to the client 120 via the network 140. Optionally, in order to maintain low latency between the server 102 and the client device 120, the encoder 312 may instruct the network 140 to deliver the EFOV frames stream using a real time media transfer protocol, for example, real time transport protocol (RTP) and/or the like over an ultra-low latency video encoder-decoder channel having a delay of less than 10 ms (milliseconds).

The process 400 may include a plurality of iterations in which steps 404 through 414 are repeated to create VR 360 frames to the client device according to updated current orientation data received from the client device.

Optionally, the server frame manager 310 generates the EFOV frames according to the QOS of the network 140, specifically the QOS of the EFOV frames encoded stream delivery to the client device 120. A QOS/QOE controller such as the QOS/QOE controller 314 may collect, analyze and/or calculate the QOS which may be indicative of the latency, specifically the RTT of the EFOV frames delivery to the client device. The QOS/QOE controller 314 may receive from the client device 120 timing information, for example, time stamps of EFOV frames, time stamps of current orientation data associated with respective EFOV frames, RTT data and/or the like. Based on the timing information, the QOS/QOE controller 314 may calculate the QOS of the EFOV frames and provide the QOS data to the frame manager 310. While generating the EFOV frames, the frame manager 310 may dynamically adjust one or more of the EFOV frames, specifically the size (i.e., area size) of the EFOV frame(s), for example, the $\text{Diff}_{Size}$ according to the QOS to effectively compensate for the reported and/or measured QOS.

For example, assuming the QOS of the EFOV frames increases, i.e., the RTT of the EFOV frames increases, the frame manager 310 may increase the size of the EFOV frames to increase the buffer of presentation data delivered to the client device 120. The client device 120 in turn may use the larger buffer to create frames configured to FOV changes at the client device 120 which took place during the travel time of the EFOV frames from the server 102 to the client device 120. In another example, assuming the QOS of the EFOV frames decreases, i.e., the RTT of the EFOV frames decreases, the frame manager 310 may reduce the size of the EFOV frames to reduce the computing resources required at both the server 102 and the client device 120 for encoding and decoding respectively the EFOV frames. Such reduction in the computing resources may involve reduction of processing resources, reduction of storage resources and/or the like. Moreover, the reduced EFOV frames may require reduced bandwidth of the network 140 to transfer the reduced size EFOV frames. This may also reduce the RTT of the EFOV frames and improve the QOE.

Similarly, the QOS/QOE controller 314 may collect, analyze and/or calculate the QOE expressing the quality of the experience of the user 150 consuming the VR 360 video content. The QOE may be expressed for example, by the MTP, i.e., the time between changing the FOV at the client device and the time when updated EFOV frame(s) corresponding to the FOV change are received and presented to the user 150. The QOS/QOE controller 314 may receive QOE information, for example, the MTP and/or the like from the client device 120 and provide it to the frame manager 310. Based on the QOE information, the QOS/QOE controller 314 may calculate the QOS of the EFOV frames and provide the QOS data to the frame manager 310. While generating the EFOV frames, the frame manager 310 may dynamically adjust one or more of the EFOV frames, specifically the area size of the EFOV frame(s), for example, the $\text{Diff}_{Size}$ according to the QOE to effectively compensate for the reported and/or measured QOE.

Optionally, the frame manager 310 generates the EFOV frames according to prediction of the orientation of the client device 120, i.e., according to predicted FOV at the client device 120. An orientation predictor such as the orientation predictor 316 may collect the current orientation data received during several iterations of the process 100, specifically consecutive iterations preceding the current iteration and calculate predict a current orientation of the client device 120. While generating the EFOV frames, the frame manager 310 may dynamically adjust one or more of the EFOV frames, specifically a center of the EFOV frame(s) according to the predicted current orientation. While generating the EFOV frames, the frame manager 310 may dynamically adjust one or more of the EFOV frames, specifically the center of the EFOV frame(s), for example, the size of $\text{Diff}_{Size}$ at each side of the EFOV frame(s) according to the predicted orientation data. For example, assuming that based on analysis of the current orientation data received from the client device 120 during several consecutive iterations, the orientation predictor 316 identifies a right to left orientation move (along the Xaxis). The orientation predictor 316 may therefore predict that such a right to left orientation movement may continue. The frame manager 310 may therefore center one or more of the EFOV frames such that a larger $\text{Diff}_{Size}$ is set for the left side of the EFOV frame(s), i.e., in the direction of the predicted movement while a smaller $\text{Diff}_{Size}$ may be set for the right side of the EFOV frame(s). This may allow a larger buffer of presentation data in the relevant direction of movement (orientation) that may be used by the client device 120 to compensate for the latency, for example, the MTP, the RTT and/or the like between the client 120 and the server 102.

Figure 7:
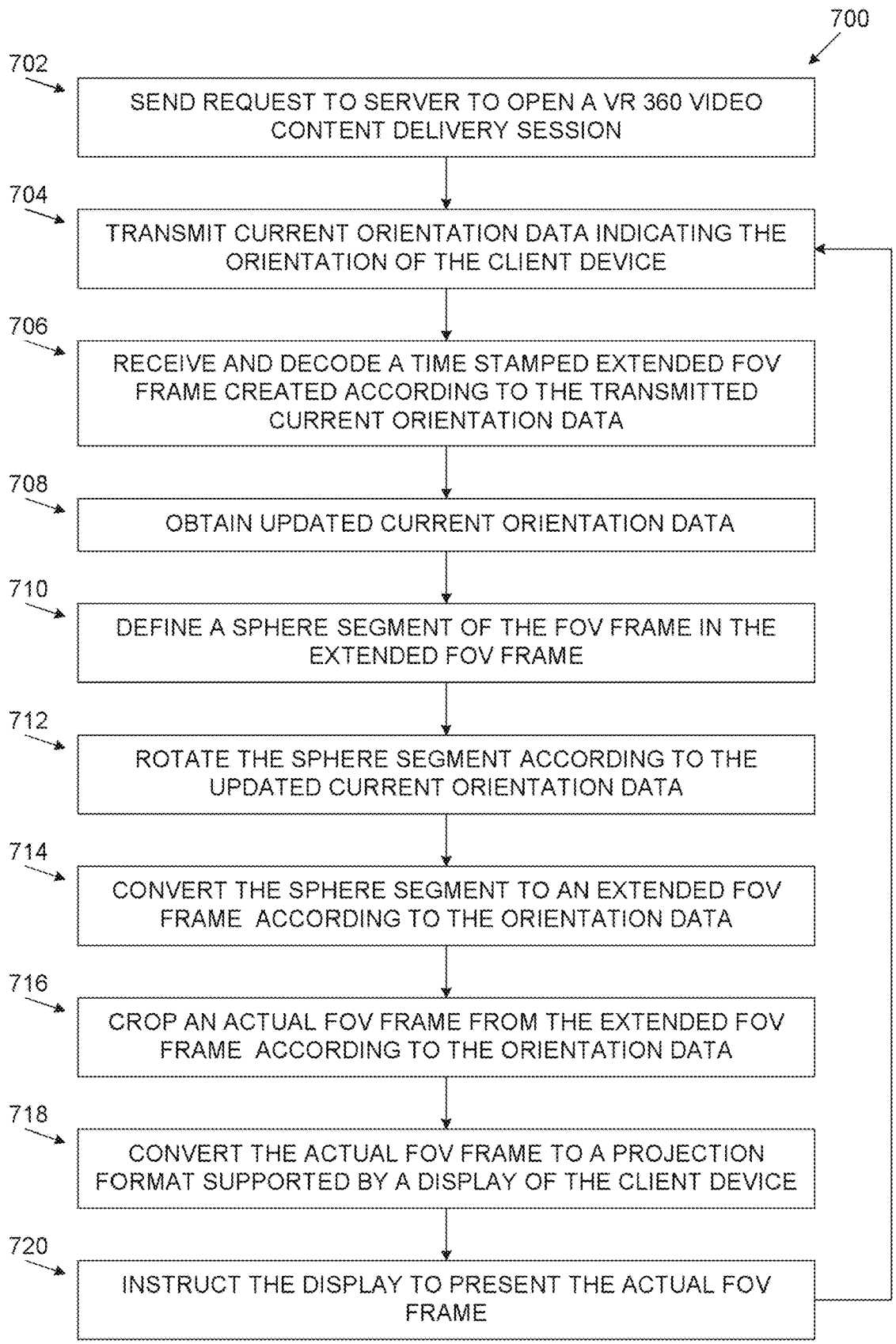
FIG. 7 is a flowchart of an exemplary process executed by a client device for receiving VR 360 video frames from a server and generating frames presented by a display to a user, according to some embodiments of the present invention.

Reference is now made to FIG. 7, which is a flowchart of an exemplary process executed by a client device for receiving VR 360 video frames from a server and generating frames presented by a display to a user, according to some embodiments of the present invention. An exemplary process 700 may be executed by a client device such as the client device 120 to receive VR 360 video content from a server (apparatus) such as the server 102 and present the VR 360 video content to a user such as the user 150. The process 700 may be controlled by a client frame manager such as the client frame manager 330.

As shown at 702, the process 700 may start with the client frame manager 330 transmitting a request to the server 102 to open and establish a communication session for receiving (streaming) VR 360 video content, for example, a certain VR 360 video file and/or the like. The communication session may utilize a session link over a network such as the network 140, for example, a transport link, a transmission link and/or the like using one or more video content delivery (streaming) protocols, for example, MPEG, H.264, H.265 and/or the like.

The session link may support exchange of data, control data, messages and/or the like between the server 102 and the client device 120. The session link may be used by the server 102 to deliver the frames of VR 360 video file to the client device 120. The session link may further be used by the client device 120 to issue control commands, for example, open, close, start, pause, play, resume and/or the like with respect to the provided VR 360 video content.

At the beginning of the session, the client frame manager 330 may transmit operational information to the server 102, in particular, capabilities of the client device 120 with respect to consumption and/or streaming of the VR 360 video. For example, the client frame manager 330 may transmit its available network resources (e.g., bandwidth, etc.), available computing resources, available storage resources and/or the like. The client frame manager 330 may further transmit operational information relating to a display such as the display 132, for example, 2D presentation support, 3D presentation support, display size, display resolution and/or the like. The client frame manager 330 may also provide the server 102 operational information relating to interaction capabilities of the user 150 with the client device 120. Such operational information may include, for example, a maximal angular velocity supported and/or allowed for the client device 120 and/or the like.

At the start of the session, the client frame manager 330 may further report, define and/or negotiate a selected projection format, for example, ERP, rectilinear projection, CMP, EAP, OHP and/or the like. At this time, the client frame manager 330 may also report, define and/or negotiate a selected format of time stamping, a selected coordinate system, a selected angle format and/or the like which may be used during the VR 360 content streaming session.

As shown at 704, an orientation data generator such as the orientation data generator 336 may transmit the current orientation data to the server 102. The current orientation data may indicate a current orientation of the client device 120, specifically a current FOV selected by the user 150 for viewing the frames of the VR 360 video file presented by the display 132 of the client device 120. The transmission of the current orientation data may be done at a higher rate than the rate of decoding the received EFOV frames in order to increase responsiveness of the server 102 to changes in the position (FOV) of the client device 120, and thus reduce the MTP latency. For example, the current orientation data may be sent every one millisecond to the server 102 while the EFOV frames decoding may be done at a rate of, for example, 16.66 milliseconds (60 Hz), 11.11 milliseconds (90 Hz), 8.33 milliseconds (120 Hz) and/or the like. As such the orientation data generator 336 may operate independently of the client frame manager 330 thus avoiding the need to wait for completion step 720 before sending updated current orientation data to the server 102. The current orientation data may be collected, analyzed, generated and/or reported by an orientation data generator such as the orientation data generator 336. The orientation data generator 336 may generate the current orientation data according to sensory data collected, obtained and/or received data from one or more sensors such as the sensor 122 configured to monitor and capture the orientation of the client device 120. The type of the sensors 122 as well as their deployment may naturally depend on the type and capabilities of the client device 120 and/or of the display 132.

For example, the client device 120 may include the HMD, the stereoscopic goggles and/or the like in which the display 132 supports 3D presentation. In such a case, the sensor(s) 122 may include for example, the accelerometer, the gyroscope, the IMU, the laser position sensor, the imaging sensor and/or the like configured to monitor and capture gestures and/or movements of the user 150. The gestures and/or movements of the user 150, for example, head gestures, hand(s) gestures, bodily gestures/movements and/or the like may indicate the orientation of the client device 120 selected by the user 150, specifically the FOV of the VR 360 video content selected by the user 150 to be presented by the display 132.

In another example the client device 120 may comprise a 2D display (flat screen) supporting a 2D presentation, for example, a Smartphone, a tablet and/or the like. In such case the sensor(s) 122 may include, for example, the accelerometer, the gyroscope, the IMU and/or the like configured to monitor and capture the orientation of the client device 120 itself. The orientation of the client device 120 may indicate the FOV of the VR 360 video content selected by the user 150 to be presented by the display 132. In such case the sensor(s) 122 may further be utilized by one or more pointing device, for example, a mouse, a touch screen, a touchpad and/or the like which may indicate the orientation selected by the user 150 for viewing the VR 360 video content.

The current orientation data may include positioning information, for example, the horizontal FOV angle value, the vertical FOV angle value, the yaw value, the roll value and the pitch value, of the client device 120. The current orientation data may typically include a time stamp assigned to the current orientation data by the client device 120 where each time stamp indicates a capture time of the associated orientation data. The time stamp may be assigned to the associated orientation data by the orientation data generator 336 and/or by one or more of the sensors 122 capturing the sensory data.

Optionally, the client frame manager 330 transmits the QoS and/or the QoE information, for example, the MTP and/or the like to the server 102, specifically to a QOS/QOE controller such as the QOS/QOE controller 314. The QoS and/or the QoE may be collected, analyzed and/or generated by a QOS/QOE collector such as the QOS/QOE collector 334. The QoS and/or the QoE information may be indicative of the latency, specifically the RTT of data delivery from the server 102 to the client device 120.

As shown at 706, a decoder such as the decoder 332 may receive an encoded stream comprising one or more EFOV frames from the server 102, specifically from the decoder 312. The encoded stream may be encoded using one or more encoding protocols, specifically video encoding protocols, for example, MPEG, H.264, H.265, H.266 and/or the like. The encoded stream and/or one or more additional streams may further include the additional data associated with one or more of the EFOV frames. The decoder 332 may decode the encoded stream(s) to extract the EFOV frames and optionally the associated additional data.

The decoder 332 may provide the EFOV frames and/or the additional data to the client frame manager 330. The decoder 332 may further provide data, in particular, the additional data to the QOS/QOE collector 334 which may generate the QoS and/or QoE based on the timing information of the additional data, for example, the time stamps included in the additional data. The QOS/QOE collector 334 may calculate the RTT according to timing information, for example, the time stamps. The QOS/QOE collector 334 may further calculate the MTP according to the timing of reception of the EFOV frames by the decoder 332 compared to the time stamps of the current orientation data associated with one or more of the EFOV frames, i.e., the timing of the current orientation data used to generate a respective EFOV frame(s).

As shown at 708, the client frame manager 330 obtains updated current orientation data from the orientation data generator 336 which generates the updated current orientation data according to updated sensory data obtained from the sensor(s) 122. The updated current orientation data indicates an updated orientation of the client device 120 which may have changed since the last transmission of the current orientation data to the server 120. The updated current orientation data may be designated by ($yaw_{client}$, $pitch_{client}$, $roll_{client}$) which are the updated current yaw, pitch and roll values of the client device 120.

Since the orientation of the client device 120 may have changes, i.e., the user 150 has selected a new FOV to view the VR 360 video presented by the display 132, the EFOV frames which were generated by the server according to the previously transmitted current orientation data, may not be aligned with the updated current orientation data. One or more of the EFOV frames may therefore need to be adjusted, for example, cropped, shifted, zoomed-in/zoomed-out and/or the like in order to adapt to the updated current orientation data.

As shown at 710, the client frame manager 330 defines a size of the FOV frame to be presented by the display 132, for example, a width, a height and/or the like. The client frame manager 330 may apply the operations and/or methods described in step 406 of the process 400 to define the size of the FOV frame naturally using different parameters. The client frame manager 330 may define the size of the FOV frame ($W_{VP}$, $H_{VP}$) according to:

updated values of FOV angles, i.e., the horizontal FOV angle value ($F_H$) and the vertical FOV angle value ($F_V$); and dimensions of the ERP format.

The client frame manager 330 may also define the updated grid points ($m_{client}$, $n_{client}$) of the frame to be generated for presentation by the display 132.

The client frame manager 330 may then project the grid points ($m_{client}$, $n_{client}$) on a sphere as follows: ($m_{client}$, $n_{client}$)→($u_{client}$, $v_{client}$)→(X', X', Z').

Figure 6:
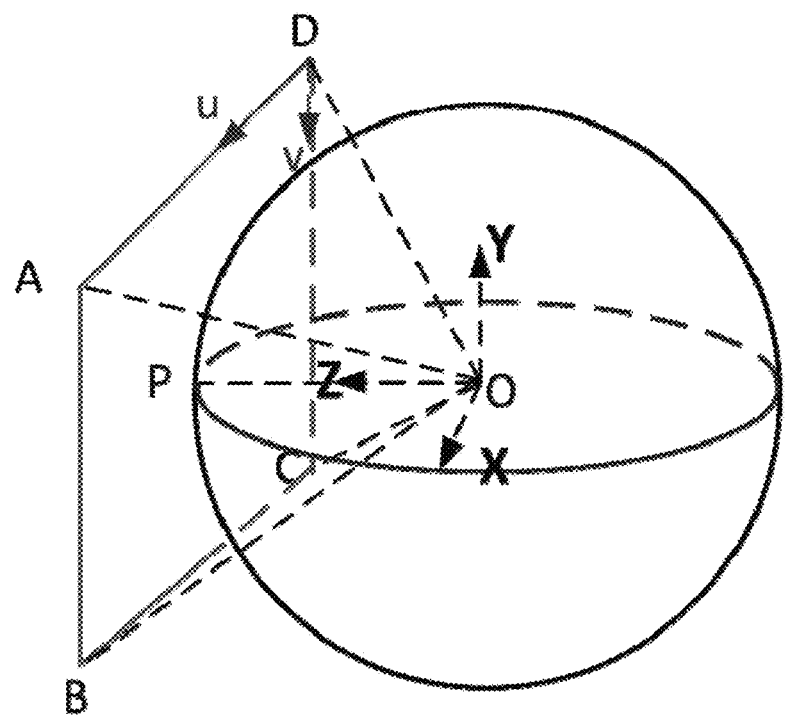
FIG. 6 is a schematic illustration of a viewport projection.

Reference is now made to FIG. 6, which is a schematic illustration of viewport generation with rectilinear projection.

The conversion from grid points on the viewport frame ($m_{client}$, $n_{client}$)

$$0 \leq m_{client} < W_{VP}$$

$$0 \leq n_{client} < H_{VP}$$

to the 2D ($u_{client}$, $v_{client}$) plane for rectilinear projection is given by:

$$u_{client} = (m_{client} + 0.5) * 2 * \tan(F_H/2) / W_{VP}$$

$$v_{client} = (n_{client} + 0.5) * 2 * \tan(F_V/2) / H_{VP}$$

Then, the conversion from ($u_{client}$, $v_{client}$) to the 3D coordinates (X,Y,Z):

$$X = u_{client} - \tan(F_H/2)$$

$$Y = -v_{client} \tan(F_V/2)$$

$$Z = 1$$

Projecting the point (X,Y,Z) to the point (X', Y', Z') on the unit sphere is given by:

$$X'=X/\sqrt{X^2+Y^2+Z^2}$$

$$Y'=Y/\sqrt{X^2+Y^2+Z^2}$$

$$Z'=1/\sqrt{X^2+Y^2+Z^2}$$

As shown at 712, the client frame manager 330 may rotate the segment of the sphere to align the segment of the sphere with the updated FOV selected by the user 150 and indicated by the updated current orientation of the client device 120. The client frame manager 330 may apply the operations and/or methods described in step 408 of the process 400 to rotate the sphere.

The client frame manager 330 may use a rotation matrix to rotate the sphere, specifically the segment of the sphere, according to the updated current orientation data, specifically, the updated current yaw, pitch and roll values of the client device 120 in order to align Z axis of the sphere with the Z axis of the FOV of the user 150.

The client frame manager 330 may apply the following conversion for the rotation:

$$[X,Y,Z]=R_{XYZ_{client}} \cdot R'_{XYZ_{server}}[X',Y',Z'].$$

Where $$R_{XYZ_{client}}=R_Y(\text{yaw}_{client}) \cdot R_Z(-\text{pitch}_{client}) \cdot R_X(\text{roll}_{client}),$$
and $$R'_{XYZ_{server}}=R_X(-\text{roll}_{server}) \cdot R_Z(\text{pitch}_{server}) \cdot R_Y(-\text{yaw}_{server}).$$

The rotation includes multiplication of two rotation matrixes. The first rotation ($R'_{XYZ_{server}}$) is applied to each point [X', Y', Z'] on the unit sphere to inverse the rotation that was applied at the server. The second rotation ($R_{XYZ_{client}}$) is then applied such that the pixels of the EFOV frame sphere may be aligned with the FOV of the user 150 expressed through the updated current orientation data.

As shown at 714, the client frame manager 330 may convert the rotated segment of the sphere of the EFOV frame to one of a plurality of projection formats, for example, ERP, rectilinear projection, CMP, EAP, OHP and/or the like. The client frame manager 330 may apply the operations and/or methods described in step 410 of the process 400 to convert the updated EFOV frame. The client frame manager 330 may apply the conversion as follows [X, Y, Z]→($\phi_r$, $\theta_r$)→ ($u_r$, $v_r$)→($m_r$, $n_r$) as described in step 410 of the process 400.

As shown at 716, the client frame manager 330 may crop an actual FOV frame from the rotated EFOV according to the updated orientation data. The client frame manager 330 may crop the ERP part of the EFOV frame, designated $EFOV_{crop}$ and its indices ($m_{r_{crop}}$, $n_{r_{crop}}$) related to the actual FOV frame.

The client frame manager 330 may further interpolate ERP samples from ($m_{r_{crop}}$, $n_{r_{crop}}$) to ($m_{client}$, $n_{client}$) grid point using the $EFOV_{crop}$ as described in step 410 of the process 400. The interpolation is needed since ($m_{client}$, $n_{client}$), which is a result of the projection from the sphere points (X,Y,Z) to point on the destination ERP plane, may not be located at a grid point in the ERP plane. A more efficient alternative is to first apply the interpolation of ERP samples at the source plane, i.e., ERP plane before the rotation by $R_{XYZ_{client}} \cdot R'_{XYZ_{server}}$. In this alternative these grid points are at the neighborhood of the inverse projection (and inverse rotation) point, which is not necessary falls at a grid point.

As shown at 718, the client frame manager 330 may convert the actual FOV frame in the ERP projection format to a projection format supported by the display 132, for example, the rectilinear projection format.

Naturally, in case the display 132 supports 3D presentation, the client frame manager 310 repeats the process to generate two actual FOV frames, the first for the right eye and the second for the left eye. For client devices 120 in which the display 132 supports only 2D presentation, a single actual FOV frame may be created.

As shown at 720, the client frame manager 330 may instruct the display 132 to present the actual FOV frames.

The process 700 may include a plurality of iterations in which steps 706 through 720 are repeated to receive a stream of VR 360 frames from the server 102 according to the current orientation data, and step 704 may be repeated in higher rate to transmit the current orientation data.

As discussed herein before, transmission of the current orientation data (step 704) may be done at higher rates than the rate decoding the EFOV frames (steps 706-720) in order to increase responsiveness of the server 102 to changes in the position (FOV) of the client device 120, thus reduce the MTP latency. The orientation data generator 336 may therefore operate independently of the client frame manager 330, thus avoiding the need to wait for completion step 720 before sending updated current orientation data to the server 102.

Figure 8:
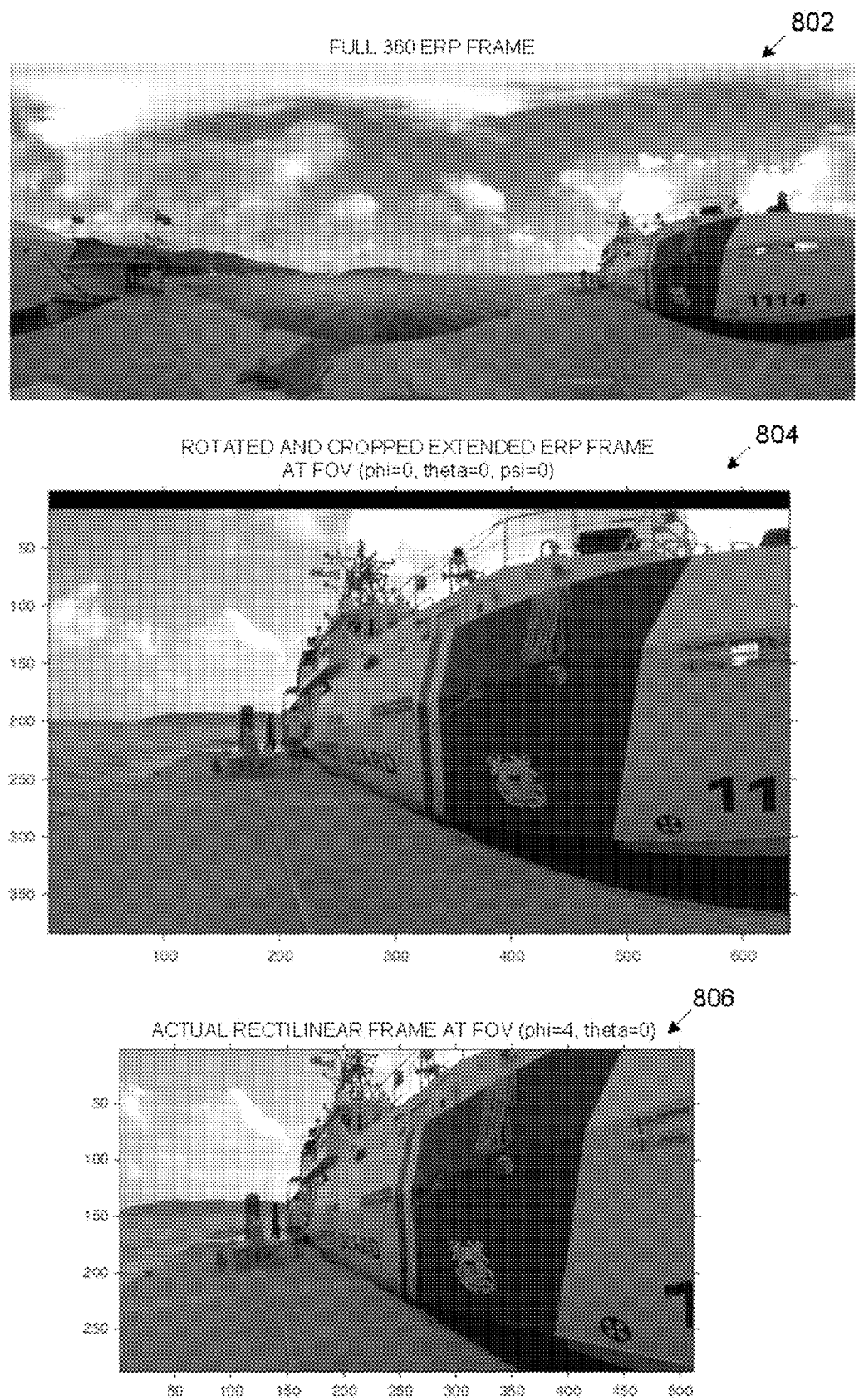
FIG. 8 shows an exemplary VR 360 video frame, an exemplary respective EFOV frame generated from the VR 360 video frame, and a respective actual FOV frame generated from the EFOV frame, according to some embodiments of the present invention.

Reference is now made to FIG. 8, which is a capture of an exemplary VR 360 video frame, an exemplary respective EFOV frame generated from the VR 360 video frame and a respective actual FOV frame generated from the EFOV frame, according to some embodiments of the present invention. An exemplary VR 360 video 802 may be processed, for example, cropped, rendered and/or the like by a server frame manager such as the server frame manager 310 according to the orientation data received from a client device such as the client device 120. The server frame manager 310 may create an exemplary EFOV frame 804 which is centered in the Euler angles coordinates system at ($\phi$=0, $\theta$=0, $\psi$=0). The EFOV frame 804 may then be encoded and transmitted to the client device 120. A decoder such as the decoder 332 executed by the client device 120 may receive the encoded stream carrying the EFOV frame 804 and decode the stream to extract the EFOV frame 804. A client frame manager such as the client frame manager 330 may process the EFOV frame 804 to generate a respective actual FOV frame 806 in rectilinear projection format which is adjusted according to the size of the actual FOV frame presented by a display such as the display 132. Moreover, as can be seen, the EFOV frame 804 is rotated according to updated current orientation data such that the FOV frame 806 is centered at ($\phi$=4, $\theta$=0).

The processing unit may be any kind of programmable or non-programmable circuitry that is configured to carry out the operations described above. The processing unit may comprise hardware as well as software. For example, the processing unit may comprise one or more processors and a transitory or non-transitory memory that carries a program which causes the processing unit to perform the respective operations when the program is executed by the one or more processors.

It is expected that during the life of a patent maturing from this application many relevant projection formats, encoding techniques and video transport will be developed and the scope of the terms projection formats, encoding techniques and video transport are intended to include all such new technologies a priori.

As used herein, the term "about" refers to ±10%.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

What is claimed is:

1. An apparatus for delivering virtual reality data portions to a client device, comprising:
   a processing unit configured to perform the following in each one of a plurality of iterations:
   receive from network current orientation data indicating a current orientation of a client device;
   apply a rotation to a segment of a sphere defined in a virtual reality (VR) video file according to the current orientation;
   crop from the rotated segment of the sphere in an equirectangular projection format an extended field of view (EFOV) frame in the equirectangular projection format according to the current orientation; and
   instruct the network to transmit the EFOV frame to the client device;
   wherein the processing unit is further configured to,
   receive round trip delay time (RTT) data originating from the client device, the RTT data being received in a quality of experience (QoE) message comprising a time stamp; and
   calculate an estimated latency value for a communication between the apparatus and the client device over the network according to the time stamp;
   wherein an area of the EFOV frame is calculated according to the estimated latency value, with the area of the EFOV frame increasing in response to the estimated latency value increasing;
   wherein a maximum allowed latency that may be compensated for by presentation data of an extra area of the EFOV frame depends upon only a one-side extra range in one EFOV of the frame.

2. The apparatus of claim 1, wherein the processing unit is configured to instruct the network to transmit the EFOV frame in a real-time media transfer protocol in an ultra-low-latency video encoder—decoder channel having a delay of less than 10 milliseconds.

3. The apparatus of claim 1, wherein the processing unit is configured to convert the EFOV frame from the equirectangular projection format to a rectilinear format before the transmission of the EFOV frame to the client device via the network.

4. The apparatus of claim 1, wherein the area of the EFOV frame is further calculated according to a maximum angular velocity of a display receiving the EFOV frame from the client device and/or according to a maximum velocity of displacement in the current orientation data.

5. The apparatus of claim 1, wherein an area of the EFOV frame is a function of field of an equirectangular projection format height and width values of the VR video file and field of view (FOV) height and width values determined according to the current orientation data.

6. The apparatus of claim 1, wherein the orientation data comprises at least one member of the group consisting of: a horizontal field of view, FOV, angle value, a vertical FOV angle value, a yaw value, a roll value and a pitch value, of the client device.

7. The apparatus of claim 1, wherein the current orientation data of the client device comprises a time stamp.

8. The apparatus of claim 1, wherein the EFOV frame is associated with a member of a group consisting of: orientation data, frame size of a frame designed to be cropped from the EFOV frame, and a frame size in an equirectangular projection format.

9. The apparatus of claim 1, wherein a time stamp and/or the orientation data, associated with the EFOV frame is transmitted to the client device via the network using a member of the group consisting of: image data embedded in the frame, text data added to the frame header, and separate network message comprising an identification code, wherein a corresponding identification code is also associated with the EFOV frame as image data or text data.

10. The apparatus of claim 1, wherein the processing unit is further configured to calculate a center of the EFOV frame according to a predicted orientation of the client device calculated based on the current orientation data received in a current iteration and one or more previous iterations of the plurality of iterations.

11. The apparatus of claim 10, wherein the processing unit centers the EFOV frame such that an extra area on each side of the EFOV frame differs based upon the predicted orientation of the client device.

12. The apparatus of claim 1, wherein:
a transmission rate of the current orientation data is done at a higher rate than a rate of decoding of the EFOV frame.

13. The apparatus of claim 1, wherein a maximum allowed latency that may be compensated for by presentation data of an extra area of the EFOV frame depends upon a maximum angular velocity of the client device.

14. The apparatus of claim 1, wherein transmission of the current orientation data from the processing unit to the client device is at a higher rate than a decoding rate of the EFOV frame by the client device.

15. The apparatus of claim 1, wherein the EFOV frame is constructed before receiving the current updated orientation data from the client device.

16. The apparatus of claim 1, wherein:
the maximum allowed latency that may be compensated for by presentation data of an extra area of the EFOV frame depends upon a given maximum angular velocity of the client device.

17. A client device for sequentially presenting virtual reality data portions, comprising:
a display;
a network interface configured to:
  send, via a network, orientation data of the client device, measured in each of a plurality of iterations, and
  receive an extended field of view (EFOV) frame in an equirectangular projection format in response to sending the orientation data; and
a processing unit configured to perform the following in response to receiving the EFOV frame:
  rotate the EFOV frame according to an updated current orientation data measured for the client device,
  crop an actual field of view frame from the rotated EFOV frame according to the updated current orientation data,
  convert the actual field of view frame to a projection format defined by properties of the display, and
  instruct a presentation of the actual field of view frame in the projection format on the display;
wherein the processing unit is further configured to:
generate round trip delay time (RTT) data, and forwarding the RTT data in a quality of experience (QoE) message comprising a time stamp via the network; and
calculate an estimated latency value for a communication between the apparatus and the client device over the network according to the time stamp;
wherein an area of the EFOV frame is calculated according to the estimated latency value, with the area of the EFOV frame increasing in response to the estimated latency value increasing;
wherein a maximum allowed latency that may be compensated for by presentation data of an extra area of the EFOV frame depends upon only a one-side extra range in one EFOV of the frame.

18. The client device of claim 17, further comprising:
one or more orientation sensors;
wherein the current orientation data and the updated current orientation data are acquired from the one or more orientation sensors, each of the one or more orientation sensors being adapted to measure a current orientation of the client device.

19. The client device of claim 17, wherein the processing unit is configured to convert the EFOV frame or the actual field of view frame from an equirectangular projection format to a rectilinear format before the presentation of the actual field of view frame.

20. The client device of claim 17, wherein the current orientation data comprises at least one member of the group consisting of: a horizontal field of view, FOV, angle value, a vertical FOV angle value, a yaw value, a roll value and a pitch value.

21. The client device of claim 17, wherein:
the maximum allowed latency that may be compensated for by presentation data of an extra area of the EFOV frame depends upon a given maximum angular velocity of the client device.

22. A method for sequentially presenting virtual reality data portions, comprising:
in each of a plurality of iterations, performing the following:
sending from a client device, via a network, to an apparatus a current orientation data measured for the client device and round trip delay time (RTT) data; in a quality of experience (QoE) message comprising a time stamp;
receiving, via the network, an extended field of view (EFOV), frame in an equirectangular projection format in response to sending of the current orientation value;
calculating an estimated latency value for a communication between the apparatus and the client device according to the time stamp; and
calculating an area of the EFOV according to the latency value, with the area of the EFOV frame increasing in response to the estimated latency value increasing;
in response to receiving the EFOV frame:
  acquiring an updated current orientation value measured for the client device after the current orientation data is measured,
  rotating the EFOV frame according to the updated current orientation value,
  cropping an actual field of view frame from the rotated EFOV frame according to the updated current orientation value, and
  presenting the actual field of view frame on a display of the client device;
wherein the actual field of view frame is converted to a rectilinear format before the presentation of the actual field of view frame;
wherein a maximum allowed latency that may be compensated for by presentation data of an extra area of the EFOV frame depends upon only a one-side extra range in one EFOV of the frame.

23. The method of claim 22, wherein:
the maximum allowed latency that may be compensated for by presentation data of an extra area of the EFOV frame depends upon a given maximum angular velocity of the client device.

24. An apparatus for delivering virtual reality data portions to a client device, comprising:
a processing unit configured to perform the following in each one of a plurality of iterations:
receive from network current orientation data indicating a current orientation of a client device;
apply a rotation to a segment of a sphere defined in a virtual reality (VR) video file according to the current orientations;
crop from the rotated segment of the sphere in an equirectangular projection format an extended field of view (EFOV) frame in the equirectangular projection format according to the current orientation; and instruct the network to transmit the EFOV frame to the client device;

wherein the processing unit is further configured to, receive round trip delay time (RTT) data originating from the client device, the RTT data being received in a quality of experience (QoE) message comprising a time stamp; and calculate an estimated latency value for a communication between the apparatus and the client device over the network according to the time stamp;

wherein an area of the EFOV frame is calculated according to the estimated latency value, with the area of the EFOV frame increasing in response to the estimated latency value increasing; and wherein:

an extra area of the EFOV frame is $\text{Diff}_{Size}$, a maximum time delay which is a maximum allowed latency that may be compensated for with presentation data of the $\text{Diff}_{Size}$ for a given maximum angular velocity is $T_{comp}$ and $T_{comp}$ is presented in equation 1 below, Equation 1

$$T_{comp} = \frac{\text{Diff}_{Size}[deg]}{MxAnS[deg/ms]} \quad [1]$$

where $\text{Diff}_{Size}[deg]$ is a one-side extra range in one EFOV frame and MxAnS [deg/ms] is the maximum angular velocity.

* * * * *